United States Patent
Kanda et al.

(10) Patent No.: US 9,544,197 B2
(45) Date of Patent: Jan. 10, 2017

(54) COMMUNICATION TERMINAL, COMMUNICATION SYSTEM, DISPLAY CONTROL METHOD, AND RECORDING MEDIUM STORING DISPLAY CONTROL PROGRAM

(71) Applicants: Hiroyuki Kanda, Kanagawa (JP); Takahiro Asai, Kanagawa (JP)

(72) Inventors: Hiroyuki Kanda, Kanagawa (JP); Takahiro Asai, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 241 days.

(21) Appl. No.: 13/864,721

(22) Filed: Apr. 17, 2013

(65) Prior Publication Data
US 2013/0298031 A1 Nov. 7, 2013

(30) Foreign Application Priority Data

May 1, 2012 (JP) ................................ 2012-104416
Mar. 15, 2013 (JP) ................................ 2013-053544

(51) Int. Cl.
*H04L 12/24* (2006.01)
*H04L 29/06* (2006.01)
(Continued)

(52) U.S. Cl.
CPC ........... *H04L 41/22* (2013.01); *H04L 65/1083* (2013.01); *H04L 65/403* (2013.01); *H04N 7/147* (2013.01);
(Continued)

(58) Field of Classification Search
CPC ..... G06F 3/0484; G06F 3/048; G06F 3/04842
(Continued)

(56) References Cited

U.S. PATENT DOCUMENTS

| 2002/0089973 | A1* | 7/2002 | Manor | H04N 17/004 370/352 |
| 2004/0111739 | A1* | 6/2004 | Winegard | H04N 7/148 725/31 |

(Continued)

FOREIGN PATENT DOCUMENTS

| JP | 2001-326972 | 11/2001 |
| JP | 2008-227577 | 9/2008 |

OTHER PUBLICATIONS

Microsoft Lync—2010.*
Lifehacker—Battle of the iOS Video Chat Applications FaceTime vs. Skype (Jan. 14, 2011).*

*Primary Examiner* — David Choi
(74) *Attorney, Agent, or Firm* — Oblon, McClelland, Maier & Neustadt, L.L.P.

(57) ABSTRACT

At a communication terminal, visual information reflecting an operation state of a candidate counterpart terminal and a graphical image that allows the communication terminal to switch from a first communications protocol to a second communications protocol, is displayed, respectively, when the communication terminal activates the first communications protocol. In response to a user instruction for selecting the graphical image, the communication terminal activates the second communications protocol to cause the communication terminal to communicate using the second communications protocol.

17 Claims, 15 Drawing Sheets

(51) Int. Cl.
  *H04N 7/14* (2006.01)
  *H04N 7/15* (2006.01)
  *H04N 21/845* (2011.01)
  *H04M 3/56* (2006.01)
(52) U.S. Cl.
  CPC .............. *H04N 7/152* (2013.01); *H04M 3/567* (2013.01); *H04N 21/8451* (2013.01)
(58) Field of Classification Search
  USPC ........................................................ 715/733
  See application file for complete search history.

(56) References Cited

U.S. PATENT DOCUMENTS

| | | | | |
|---|---|---|---|---|
| 2004/0172455 A1* | 9/2004 | Green | ................... | G06Q 10/107 709/207 |
| 2005/0038856 A1* | 2/2005 | Krishnasamy | .......... | H04L 12/58 709/206 |
| 2005/0243742 A1* | 11/2005 | Hansen | ............ | H04L 29/06027 370/264 |
| 2006/0129646 A1* | 6/2006 | Rhee | ...................... | H04L 12/581 709/206 |
| 2007/0263075 A1* | 11/2007 | Nimri | .................. | H04L 12/1818 348/14.08 |
| 2007/0288627 A1* | 12/2007 | Abella | ............. | H04N 21/64322 709/224 |
| 2010/0088646 A1* | 4/2010 | Nishimori | .............. | H04N 19/61 715/838 |
| 2012/0106378 A1* | 5/2012 | Altman | .................. | H04L 63/102 370/252 |
| 2012/0140633 A1* | 6/2012 | Stanwood | ........... | H04L 47/2458 370/235 |
| 2012/0257002 A1* | 10/2012 | Stocker | ............... | H04M 7/0024 348/14.08 |
| 2012/0274733 A1* | 11/2012 | Yano | ...................... | H04M 1/02 348/14.08 |
| 2013/0298031 A1* | 11/2013 | Kanda | .................... | H04L 41/22 715/733 |
| 2013/0301830 A1* | 11/2013 | Bar-El | ...................... | H04L 9/08 380/210 |

* cited by examiner

FIG. 10

VISUAL INFORMATION MANAGEMENT TABLE

| OPERATION STATE | VISUAL INFORMATION (ICON) |
|---|---|
| ONLINE (COMMUNICATION OK) | |
| ONLINE (COMMUNICATING) | |
| ONLINE (INTERRUPTED) | |
| OFFLINE | |
| NON-DEDICATED TERMINAL FUNCTION | |

FIG. 11

RELAY DEVICE MANAGEMENT TABLE

| RELAY DEVICE ID | OPERATION STATE | DATE AND TIME RECEIVED | RELAY DEVICE IP ADDRESS | MAXIMUM DATA TRANSMISSION SPEED (Mbps) |
|---|---|---|---|---|
| 111a | ON LINE | 2011.11.10.13:00 | 1.2.1.2 | 100 |
| 111b | ON LINE | 2011.11.10.13:10 | 1.2.2.2 | 1000 |
| 111c | OFF LINE | 2011.11.10.13:20 | 1.3.1.2 | 10 |

FIG. 12

TERMINAL AUTHENTICATION MANAGEMENT TABLE

| TERMINAL ID | PASSWORD |
|---|---|
| 01aa | aaaa |
| 01ab | abab |
| 01ba | baba |
| ... | ... |

FIG. 13

TERMINAL STATE MANAGEMENT TABLE

| TERMINAL ID | TERMINAL NAME | OPERATION STATE | DATE AND TIME RECEIVED | TERMINAL IP ADDRESS |
|---|---|---|---|---|
| 01aa | JAPAN TOKYO OFFICE AA TERMINAL | ONLINE (COMMUNICATION OK) | 2011.11.10.13:40 | 1.2.1.3 |
| 01ab | JAPAN TOKYO OFFICE AB TERMINAL | ONLINE (INTERRUPT) | 2011.11.09.12:00 | 1.2.1.4 |
| ... | ... | ... | ... | ... |
| 01ba | JAPAN OSAKA OFFICE BA TERMINAL | OFFLINE | 2011.11.10.13:45 | 1.2.2.3 |
| 01bb | JAPAN OSAKA OFFICE BB TERMINAL | ONLINE (COMMUNICATION OK) | 2011.11.10.13:50 | 1.2.2.4 |
| ... | ... | ... | ... | ... |
| 01ca | U.S. NY OFFICE CA TERMINAL | ONLINE (COMMUNICATION OK) | 2011.11.10.12:45 | 1.3.1.3 |
| 01cb | U.S. NY OFFICE CB TERMINAL | NON-DEDICATED TERMINAL FUNCTION | 2011.11.10.13:55 | 1.3.1.4 |
| ... | ... | ... | ... | ... |

FIG. 14

CANDIDATE LIST MANAGEMENT TABLE

| REQUEST TERMINAL ID | COUNTERPART TERMINAL ID |
|---|---|
| 01aa | 01ab,⋯,01ba,⋯,01ca,01cb |
| ⋯ | ⋯ |
| 01ba | 01aa,01ab,01ca,01cb |
| ⋯ | ⋯ |
| 01ca | 01aa,01ab,01ba |
| ⋯ | ⋯ |

FIG. 15

SESSION MANAGEMENT TABLE

| RELAY DEVICE ID | REQUEST TERMINAL ID | COUNTERPART TERMINAL ID | DELAY TIME (ms) | DATE AND TIME RECEIVED |
|---|---|---|---|---|
| 111a | 01aa | 01ca | 200 | 2011.11.10.14:00 |
| 111b | 01ba | 01cb | 50 | 2011.11.10.14:10 |
| 111c | 01bb | 01cc | 400 | 2011.11.10.14:20 |
| ⋯ | | | | ⋯ |

US 9,544,197 B2

COMMUNICATION TERMINAL, COMMUNICATION SYSTEM, DISPLAY CONTROL METHOD, AND RECORDING MEDIUM STORING DISPLAY CONTROL PROGRAM

CROSS-REFERENCE TO RELATED APPLICATIONS

This patent application is based on and claims priority pursuant to 35 U.S.C. §119 to Japanese Patent Application Nos. 2012-104416, filed on May 1, 2012, and 2013-053544, filed on Mar. 15, 2013, in the Japan Patent Office, the entire disclosure of which is hereby incorporated by reference herein.

BACKGROUND

Field of the Invention

The present invention relates to a communication terminal, communication system, display control method, and non-transitory recording medium storing a display control program.

Description of the Related Art

With the need for reducing costs or times associated with business trips, more companies are moving towards communication systems provided with teleconference or videoconference ("conference") capabilities. The communication systems allow transmission of contents data such as image data and/or sound data among a plurality of communication terminals that are remotely located from one another to facilitate communication among the plurality of communication terminals through a communication network such as the Internet.

While the communication terminals usually communicate with one another using the same communications protocol, some communication terminals are capable of switching the communications protocol in use to communicate with the counterpart communication terminals using a different communications protocol, for example, as described in Japanese Patent Application Publication No. 2001-326972-A.

SUMMARY

The communications protocol used by the communication terminal is mainly defined by a call control protocol used for connecting or disconnecting connections with the counterpart communication terminal, and an encoding format used for encoding communication data to be transmitted to the counterpart communication terminal. The background communication terminal, such as the one described in Japanese Patent Application Publication No. 2001-326972-A, executes one of two communications protocols that are different in call control protocol and in encoding format. The inventors of the present invention have realized that there is a need for developing a communication system, which allows communication between or among a plurality of communication terminals even when the call control protocol is the same but the encoding format is different for more than one communication terminal, rather than just using the communication terminal capable of switching between two different communications protocol that differ in call control protocol and encoding format.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 10 is an example data structure of a visual information management table, managed by the communication terminal of FIG. 9;

FIG. 11 is an example data structure of a relay device management table, managed by the management system of FIG. 9;

FIG. 12 is an example data structure of a terminal authentication management table, managed by the management system of FIG. 9;

FIG. 13 is an example data structure of a terminal state management table, managed by the management system of FIG. 9;

FIG. 14 is an example data structure of a candidate list management table, managed by the management system of FIG. 9;

FIG. 15 is an example data structure of a session management table, managed by the management system of FIG. 9;

Figure 1:
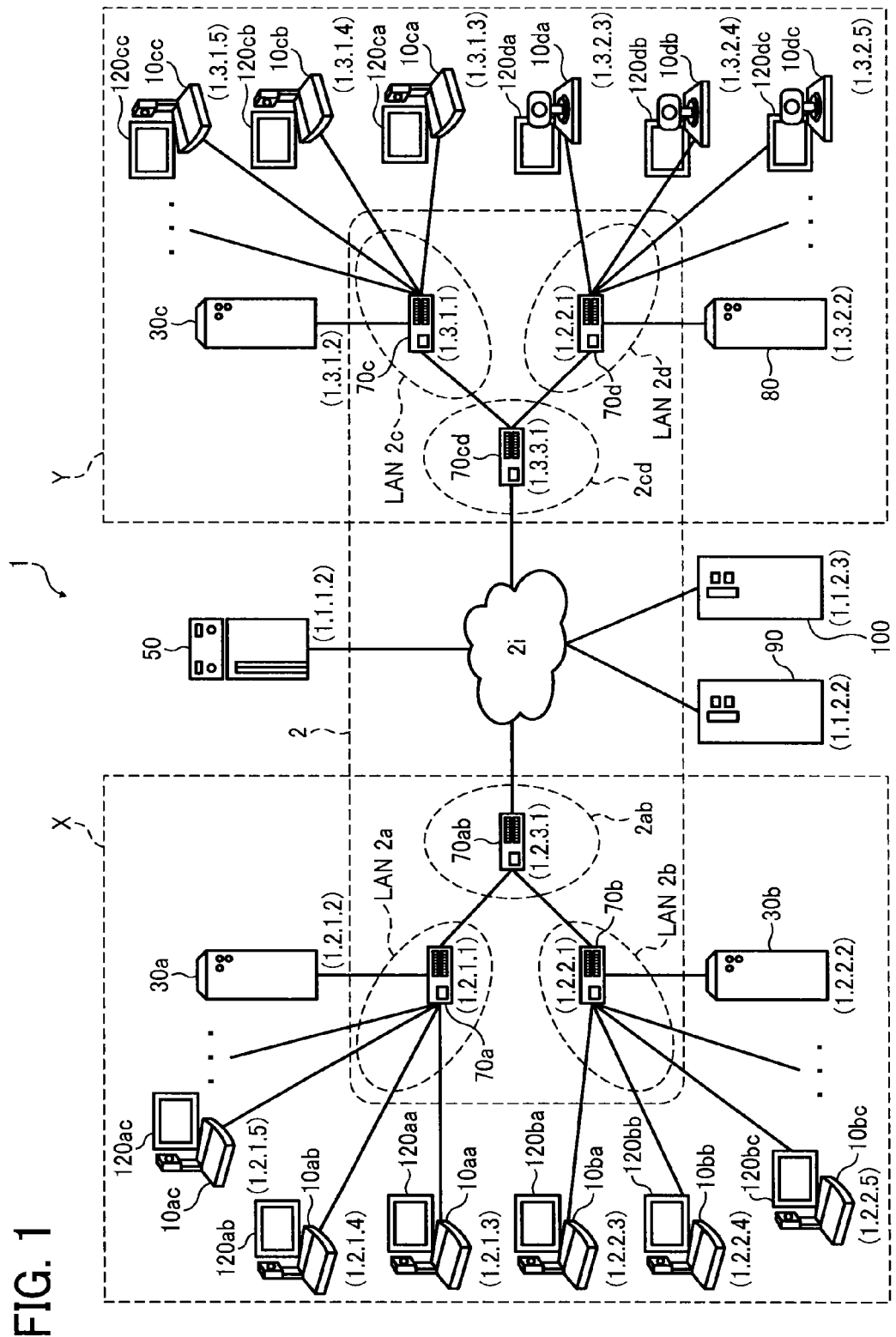
FIG. 1 is a schematic block diagram illustrating a communication system according to an example embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION OF EXAMPLE EMBODIMENTS

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

<Configuration>

FIG. 1 illustrates a configuration of a communication system 1 according to an example embodiment of the present invention. The communication system 1 of FIG. 1 includes a plurality of communication terminals 10aa, 10ab, 10ac, 10ba, 10bb, 10bc, 10ca, 10cb, 10cc, 10da, 10db, and 10dc, and a plurality of displays 120aa, 120ab, 120ac, 120ba, 120bb, 120bc, 120ca, 120cb, 120cc, 120da, 120db, and 120dc, a plurality of relay devices 30a, 30b, and 30c, a communication management system 50, a program providing system 90, and a maintenance system 100. In the following examples, the communication system 1 is implemented as a videoconference system that allows at least two of the plurality of communication terminals 10 to remotely communicate with one another. More specifically, the communication system 1 allows transmission of contents data, such as image data and sound data, between or among at least two of the plurality of communication terminals 10 to have videoconference. The communication system 1 further includes a plurality of routers 70a, 70b, 70c, 70d, 70ab, and 70cd, which may be collectively or each referred to as the router 70. The router 70 selects a route that is most suitable for transmitting contents data such as image data and sound data.

Still referring to FIG. 1, the terminals 10aa, 10ab, and 10ac, the relay device 30a, and the router 70a are connected to a local area network (LAN) 2a. The terminals 10ba, 10bb, and 10bc, the relay device 30b, and the router 70b are connected to a LAN 2b. The LAN 2a and the LAN 2b are connected to a leased line 2ab in which the router 70ab is provided. It is assumed that the LAN 2a, LAN 2b, and the leased line 2ab, are located in an area X. For example, assuming that the area X is any area in Japan, the LAN 2a could be located within an office in a city such as Tokyo, and the LAN 2b could be located within an office in another city such as Osaka.

The terminals 10ca, 10cb, and 10cc, the relay device 30c, and the router 70c are connected to a LAN 2c. The terminals 10da, 10db, and 10dc, the relay device 30d, and the router 70d are connected to a LAN 2d. The LAN 2c and the LAN 2d are connected to a leased line 2cd in which the router 70cd is provided. It is assumed that the LAN 2c, LAN2d, and leased line 2cd are located in an area Y apart from the area X. For example, assuming that the area is any area in the United States, the LAN 2c could be located within an office in a city such as New York, and the LAN 2d could be located within an office in another city such as Washington, D.C. The area X and the area Y are connected through the Internet 2i, via the routers 70ab and 70cd.

For the descriptive purposes, in this example, any number of the plurality of communication terminals 10aa to 10dc may be collectively or each referred to as the terminal 10. Any number of the plurality of displays 120aa to 120dc may be collectively or each referred to as the display 120. Any number of the plurality of relay devices 30a, 30b, and 30c may be collectively or each referred to as the relay device 30. The communication management system 50 may be referred to as the "management system" 50.

The terminal 10 that transmits data to another terminal 10 to carry out videoconference is referred to as the request terminal 10. The terminal 10 that receives data from another terminal 10 to carry out videoconference is referred to as the counterpart terminal 10. For example, the request terminal 10 includes any terminal 10 that requests another terminal 10 to start videoconference, and the counterpart terminal 10 includes any terminal 10 that is requested by the request terminal 10 to start videoconference.

The management system 50, the program providing system 90, and the maintenance system 100 are connected through the Internet 2i to the terminal 10 and the relay device 30. In this example, the conversion system 80 is connected to the router 70d on the LAN 2d, located in the area Y. Any one of the management system 50, the program providing system 90, and the maintenance system 100 may be located at any location within or outside any one of the area X and the area Y.

In this example, the communications network 2 includes the LAN 2a, LAN 2b, leased line 2ab, Internet 2i, leased line 2cd, LAN 2c, and LAN 2d. Any one or any portion of these lines or any other lines that may be included in the communications network 2 may be implemented as wired network or wireless network such as Wireless Fidelity (WiFi) network or Bluetooth network.

As shown in FIG. 1, the terminal 10, the relay device 30, the management system 50, the router 70, the program providing system 90, and the maintenance system 100 are each provided with four digit numbers. These four digit numbers separated by dots are the simple expressions of IP addresses respectively assigned to any one of the devices shown in FIG. 1, each of which has a function of communication device. For example, the IP address of the terminal 10aa is "1.2.1.3". For simplicity, it is assumed that the IP address is expressed in IPv4. Alternatively, the IP address may be expressed in IPv6.

Further, in this example, the terminal 10 may be communicated in various ways. For example, at least two different terminals 10 that are located at different rooms in the same office, or at least two different terminals 10 that are located at different offices that are remotely located from one another, may communicate with one another. In another example, at least two different terminals 10 that are located in the same room may communicate with one another. In another example, one terminal 10 that is located indoor and another terminal 10 that is located outdoor, or at least two different terminals 10 that are both located outdoor, may communicate with one another. When the terminal 10 is located outdoor, the terminal 10 communicates with the other terminal 10 through a wireless network such as a wireless network designed for a mobile phone.

The communication terminal 10 of FIG. 1 allows a user to communicate with another user at the counterpart communication terminal 10, by transmitting or receiving contents data such as image data and sound data. For example, any terminal that may be used for videoconference may be used. Further, the terminal 10 transmits or receives contents data to or from the counterpart terminal 10 using a predetermined communications protocol. The communications protocol used by the terminal 10 is mainly defined by a call control protocol used for connecting or disconnecting connections with the counterpart terminal, and an encoding format used for encoding the contents data to an IP packet.

Examples of the call control protocol being used by the terminal 10 include, but not limited to, (1) session initial protocol (SIP), (2) H.323, (3) the extended SIP, (4) Instant Messenger (IM) Protocol such as extensible messaging and presence protocol (XMPP), ICQ (Registered Trademark), AIM (Registered Trademark), or Skype (Registered Trademark), (5) protocol using the SIP message method, (6) Internet relay chat (IRC) protocol, and (7) extended IM based protocol such as Jingle.

Further, in this example, the terminal 10 includes a dedicated terminal 10, a non-dedicated terminal 10, and a dual-codec terminal 10 having the dedicated terminal communication function and the non-dedicated terminal communication function.

More specifically, any one of the communication terminal 10 that communicates data using a predetermined specific communications protocol, is referred to as the dedicated terminal 10. In one example, the dedicated terminal 10 uses the (4) IM protocol or the (7) extended IM based protocol as a call control protocol, and the Scalable Video Coding (SVC) as an encoding format. The SVC is the Annex G extension of the AGC.

Further, any one of the communication terminal 10 that communicates data using a communications protocol other than the predetermined specific communications protocol of the dedicated terminal 10, is referred to as a non-dedicated terminal 10D. In this example, when the communication terminal 10 uses a call control protocol other than the (4) IM protocol or the (7) extended IM based protocol, and an encoding format other than the SVC, it is determined that the communication terminal 10 is the non-dedicated terminal 10.

In one example, whether the terminal 10 is the dedicated terminal 10 or the non-dedicated terminal 10 may depend on a specific organization that manufactures, sells, or manages the terminal 10, as the communications protocol may be determined based on a communications network or system in use by the specific organization. The dedicated terminal 10 is defined as a communication terminal that is manufactured, sold, or managed by a specific organization such as a specific company. The non-dedicated terminal 10 is defined as a communication terminal that is manufactured, sold, or managed by an organization other than the specific organization.

In another example, whether the terminal 10 is the dedicated terminal 10 or the non-dedicated terminal 10 may depend on time when the terminal 10 is manufactured, or time when the terminal 10 is sold such as when it is released to the market. The dedicated terminal 10 may be defined as a communication terminal that is manufactured or sold by a specific organization, after the time when the non-dedicated terminal 10 is manufactured or sold by the specific organization. For example, even though the dedicated terminal 10 and the non-dedicated terminal 10 are both manufactured, sold, or managed by the same organization, the dedicated terminal 10 may be a new model such that it communicates using a different communications protocol than the communications protocol of the non-dedicated terminal 10.

Further, the dual-codec terminal 10 can switch between the non-dedicated terminal communication function and the dedicated terminal communication function, by activating one of the communication functions. When the dedicated terminal communication function is activated, the terminal 10 communicates with the counterpart dedicated terminal 10 using a call control protocol and an encoding format that are the same as the call control protocol and the encoding format of the dedicated terminal 10. When the non-dedicated terminal communication function is activated, the terminal 10 communicates with the counterpart non-dedicated terminal 10 using a call control protocol that is the same as the call control protocol of the dedicated terminal 10, and an encoding format that is the same as the encoding format of the non-dedicated terminal 10 (the encoding format that is different from the encoding format of the dedicated terminal 10).

The relay device 30 is a computer system, which may be implemented by one or more computers, to relay contents data between or among the terminals 10. The management system 50 is a computer system, which may be implemented by one or more computers, to centrally manage various information such as login information of the terminal 10, the operation state of the terminal 10 such as the communication state of the terminal 10, candidate list information, and the communication state of the relay device 30. In this example, a moving image, a still image, or both of the still image and the moving image, may be transmitted as the image data.

The program providing system 90 is a computer system, which may be implemented by one or more computers, to provide programs to the terminal 10, the relay device 30, the management system 50, and the maintenance system 100, respectively, through the communications network 2.

The maintenance system 100 is a computer system, which may be implemented by one or more computers, to maintain, manage, fix, or upgrade at least one of the terminal 10, relay device 30, management system 50, and program providing system 90. Assuming that the maintenance system 100 is provided within a country, and the terminal 10, relay device 30, management system 50, and program providing system 90 are each installed outside the country, the maintenance system 100 maintains, manages, fixes, or upgrades at least one of the terminal 10, relay device 30, management system 50, and program providing system 90, remotely through the communications network 2. The maintenance system 100 may manage maintenance of at least one of the terminal 10, relay device 30, management system 50, and program providing system 90 without using the communications network 2. For example, a machine type number, a manufacturing number, customer information, maintenance and repair information, and failure log information may be maintained at the maintenance system 100 without using the communications network 2.

Figure 2:
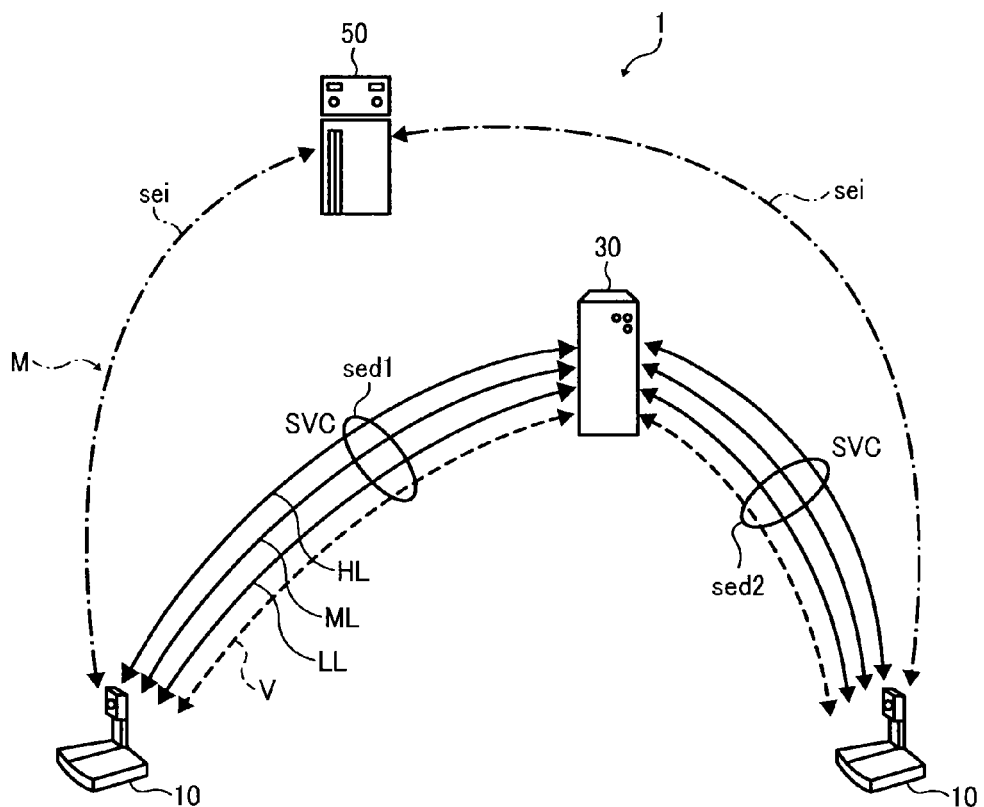
FIG. 2 is an illustration for explaining communication between or among a plurality of communication terminals each having a dedicated terminal communication function or each being a dedicated terminal.

Referring now to FIGS. 2 and 3A to 3C, a first communications pattern in which contents data are transmitted between two terminals 10 using a predetermined communications protocol is explained according to an example embodiment of the present invention. In the communication system based on the first communications pattern, the dedicated terminal or the terminal having the dedicated terminal communication function is used. FIG. 2 illustrates an environment in which the communication terminals 10, each of which is either being the dedicated terminal or provided with a dedicated terminal communication function, communicate with each other. More specifically, in this example, the request terminal 10 has the dual-codec capability such that the request terminal 10 can execute the dedicated terminal communication function, to communicate with the counterpart terminal 10, that is, the dedicated terminal 10.

As illustrated in FIG. 2, in the first communications pattern, the communication terminals 10 in the communication system 1 communicate with each other in compliance with a predetermined communications protocol. The communication terminal 10 of FIG. 2 uses the (4) IM protocol or the (7) extended IM based protocol as a call control protocol, and the H.264/SVC video coding standards as an encoding format. More specifically, in the communication system 1, the request terminal 10 and the counterpart terminal 10 establish a management data communication session "sei" through the management system 50 to transmit or receive various management data "M". The management data communication session "sei" is a communication session used for the call control process.

The request terminal 10 that executes the dedicated terminal communication function establishes a first communication session "sed1" with the relay device 30 using the SVC encoding format. The first communication session "sed1" includes four contents data communication sessions including a session "HL" to transmit high-level resolution image data, a session "ML" to transmit medium-level resolution image data, a session "LL" to transmit low-level resolution image data, and a session "V" to transmit sound data. The counterpart dedicated terminal 10 establishes a second communication session "sed2" with the relay device 30 using the SVC encoding format, which includes four contents data communication sessions including a session "HL" to transmit high-level resolution image data, a session "ML" to transmit medium-level resolution image data, a session "LL" to transmit low-level resolution image data, and a session "V" to transmit sound data.

Figure 3A:
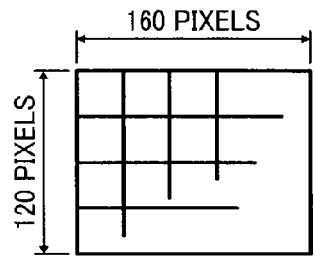
FIGS. 3A to 3C are illustrations for explaining image quality of image data transmitted or received by the communication system of FIG. 2, according to the SVC standards.
Figure 3B:
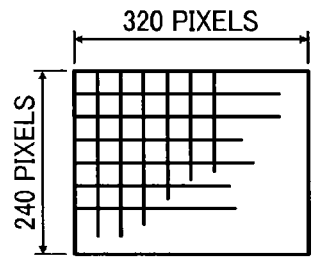
Figure 3C:
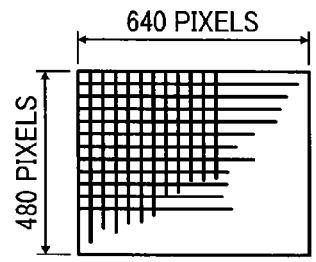

Referring now to FIGS. 3A to 3C, resolution of image data to be transmitted or received according to the first communications pattern of FIG. 2, in compliance with the SVC standards, is explained in more detail.

As illustrated in FIG. 3A, the low-level resolution image data, which functions as a base image, has 160 pixels in the horizontal direction and 120 pixels in the vertical direction. Referring to FIG. 3B, the medium-level resolution image data has 320 pixels in the horizontal direction and 240 pixels in the vertical direction. Referring to FIG. 3C, the high-level resolution image data has 640 pixels in the horizontal direction and 480 pixels in the vertical direction. In case of communicating with a narrowband signal line, low-quality image data that is generated based on the low-level resolution image data, which is the base image, is transmitted. In case of communicating with a wideband signal line, medium-quality image data that is generated based on the low-level resolution image data and the medium-level resolution image data is transmitted. In case of communicating with a broadband signal line, high-quality image data that is generated based on the low-level resolution image data, the medium-level resolution image data, and the high-level resolution image data is transmitted. Any one of the above-described types of image data may be transmitted together with sound data such as voice data.

Figure 4:
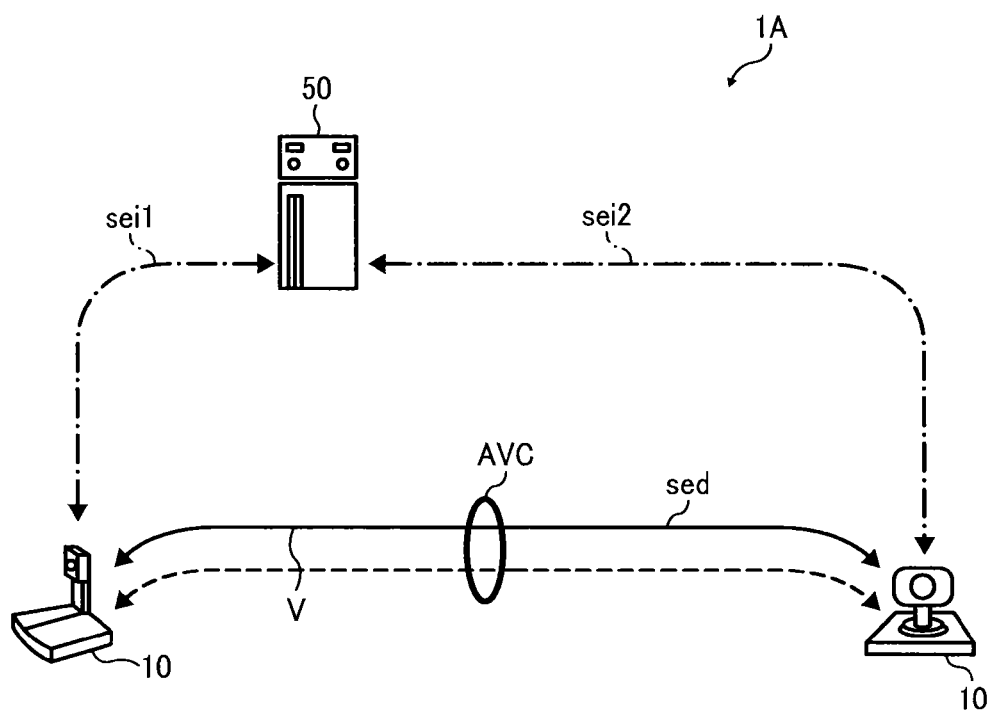
FIG. 4 is an illustration for explaining communication between or among a plurality of communication terminals each having a non-dedicated terminal communication function or each being a non-dedicated terminal.
Figure 5:
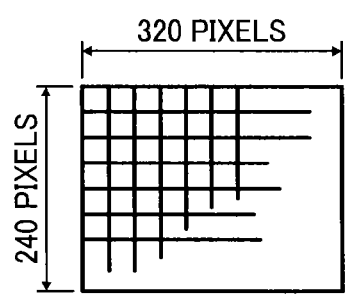
FIG. 5 is an illustration for explaining image quality of image data transmitted or received by the communication system of FIG. 4, according to the AVC standards.

Referring now to FIGS. 4 and 5, a second communications pattern in which contents data are transmitted between two terminals 10 using a communications protocol other than the communications protocol used by the communication system of FIG. 2 is explained according to an example embodiment of the present invention. In the communication system 1A based on the second communications pattern, the non-dedicated terminal or the terminal having the non-dedicated terminal communication function is used. That is, the dedicated terminal or the terminal having the dedicated terminal communication function cannot be used in the communication system 1A based on the second communications pattern. FIG. 4 illustrates an environment in which the communication terminals 10, each of which is either being the non-dedicated terminal or provided with a non-dedicated terminal communication function, communicate with each other. More specifically, in this example, the request terminal 10 has the dual-codec capability such that the request terminal 10 can execute the non-dedicated terminal communication function, to communicate with the counterpart terminal 10, that is, the non-dedicated terminal 10.

As illustrated in FIG. 4, in the communication system 1A based on the second communications pattern, the request terminal 10 communicates with the counterpart terminal 10, using the call control protocol that is the same as the call control protocol of the first communications pattern, and the encoding format that is different than the encoding format of the first communications pattern. More specifically, the request terminal 10 communicates with the counterpart terminal 10, using the (4) IM protocol or the (7) extended IM based protocol as a call control protocol, and the H.264/AVC encoding format that is different from the encoding format of the first communications pattern. As illustrated in FIG. 4, in the communication system 1A, the request terminal 10 and the management system 50 establish a management data communication session "sei1" to transmit various management data "M". The management data communication session "sei1" is a communication session used for the call control process. The request terminal 10, which executes the non-dedicated terminal communication function, changes the encoding format from SVC to AVC.

Still referring to FIG. 4, the counterpart terminal 10 and the management system 50 establish a management data communication session "sei2", which is a communication session "sei2" used for the call control process for the non-dedicated terminal. The communication session "sei2" uses a call control protocol different from that of the communication session "sei1", such as the SIP or H.323. Since call control protocols differ between the request terminal 10 and the counterpart terminal 10, the management system 50 converts the call control protocol. For example, when the request terminal 10 executes the non-dedicated terminal communication function, the management system 50 converts data related to the call control process based on conversion rule data, and performs the call control process using the converted data. Further, the counterpart terminal 10, that is, the non-dedicated terminal 10, uses the encoding format that is the same as the encoding format of the request terminal 10 that executes the non-dedicated terminal communication function, such as the AVC. The request terminal 10 and the counterpart terminal 10 establish a contents data communication session "sed" to transmit or receive contents data. The contents data communication session "sed" may be established between the request terminal 10 and the counterpart terminal 10 either directly or via the relay device 30.

Referring now to FIGS. 3A to 3C and 5, resolution of image data to be transmitted or received according to the second communications pattern of FIG. 4, in compliance with the AVC standards, is explained in more detail.

In the contents data communication session "sed" of FIG. 4, the medium-level resolution image data of FIG. 5 is transmitted or received. The medium-level resolution image data of FIG. 5 is substantially similar to the medium-level resolution image data of FIG. 3B. Any one of the above-described types of image data may be transmitted together with sound data such as voice data.

<Hardware Structure of Communication System>

Figure 6:
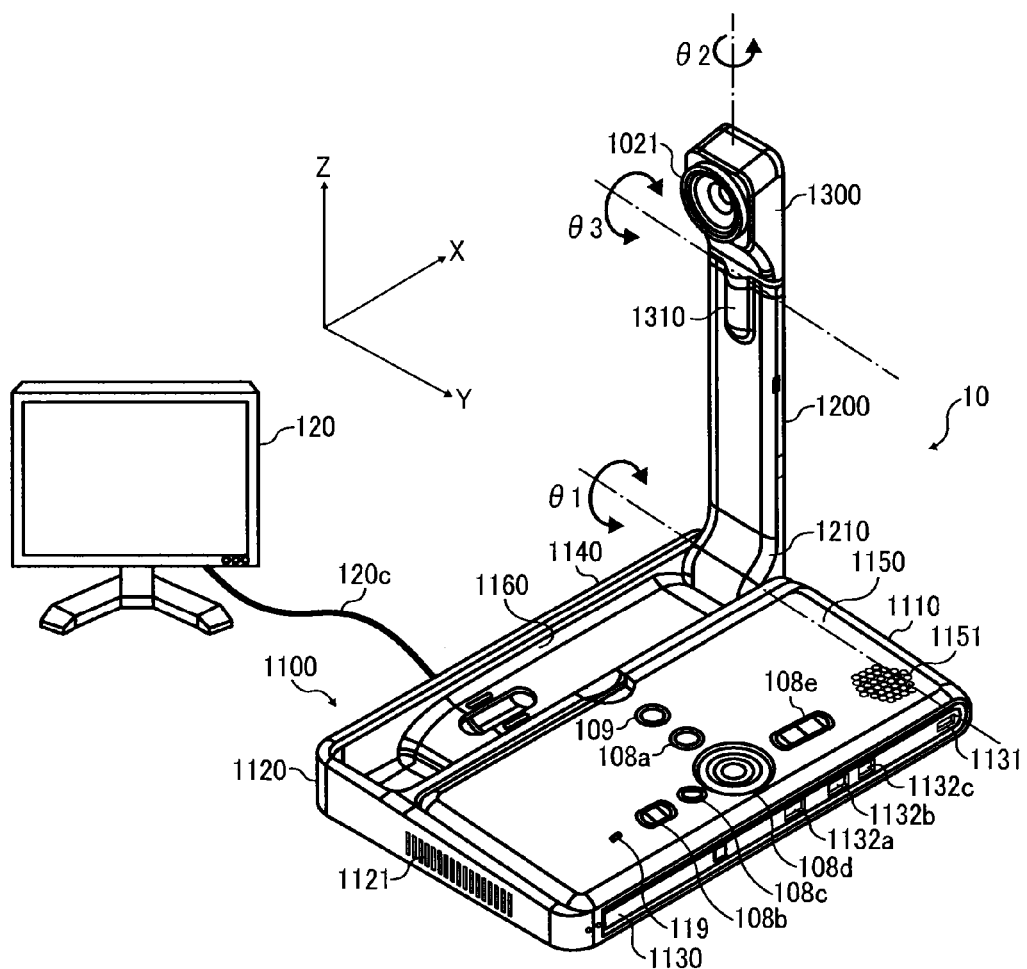
FIG. 6 is a perspective view illustrating the outer appearance of a communication terminal of the communication system of FIG. 1.

FIG. 6 is a perspective view illustrating the outer appearance of the communication terminal 10 of the communication system 1 of FIG. 1. As illustrated in FIG. 6, the terminal 10 includes a body 1100, an arm 1200, and a camera housing 1300. The body 1100 includes a back side wall 1110 having a plurality of air intake holes that are formed over the nearly entire surface of the intake surface of the back side wall 1110. The body 1100 further includes a front side wall 1120 provided with an exhaust surface 1121 having a plurality of exhaust holes over the nearly entire surface of the exhaust surface 1121. When a cooling fan that is provided within the body 1100 is driven, air flows in through the intake holes of the intake surface and out through the exhaust holes of the exhaust surface 1121. The body 1100 further includes a right side wall 1130 formed with a sound pickup hole 1131. Through the sound pickup hole 1131, a microphone 114 (FIG. 7) of the terminal 10 is able to catch sounds such as human voice or any sound including noise.

Figure 7:
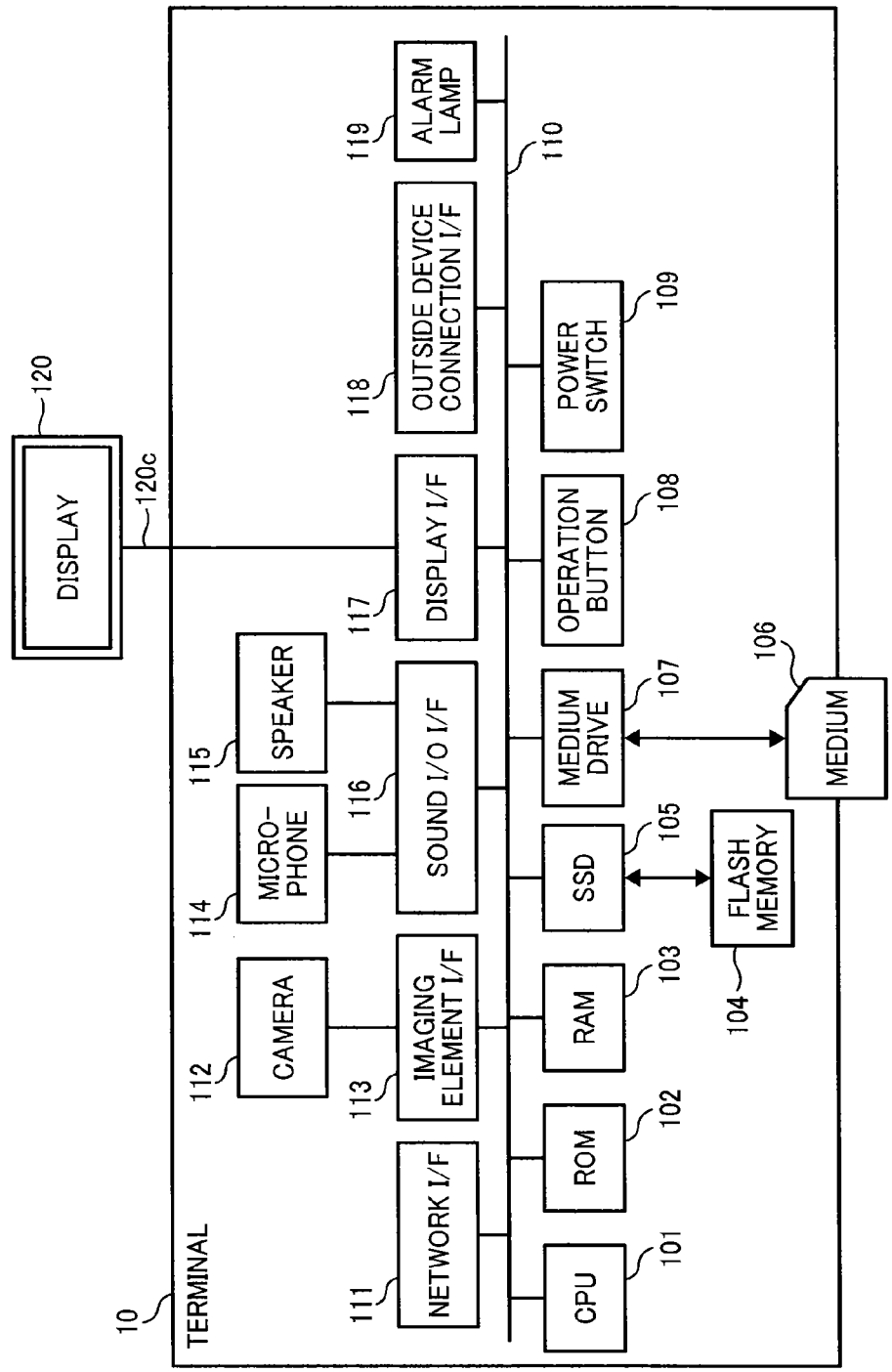
FIG. 7 is a schematic block diagram illustrating a hardware structure of the communication terminal of FIG. 6.

The body 1100 has an operation panel 1150, which is provided at a front surface toward the right side wall 1130. The operation panel 1150 includes a plurality of operation buttons 108a to 108e ("the operation button 108"), a power switch 109, an alarm lamp 119, and a plurality of sound output holes 1151. Through the sound output holes 1151, a speaker 115 (FIG. 7) of the terminal 10 is able to output sounds such as sounds generated based on human voice. The body 1100 further includes a holder 1160, which is provided at the front surface toward the left side wall 1140. The holder 1160, which has a concave shape, accommodates therein the arm 1200 and the camera housing 1300. The right side wall 1130 is further provided with a plurality of connection ports 1132a to 1132c ("connection ports 1132"). The connection ports 1132 allow electrical connection to an external device through an outside device connection I/F 118 (FIG. 7). The body 1100 further includes a left side wall 1140, which is provided with a connection port to connect the external display 120 to the display I/F 117 through a cable 120c.

The arm 1200 is fixed to the body 1100 via a torque hinge 1210. With the torque hinge 1210, the arm 1200 can be rotated in directions of up and down with respect to the body, while making a tilt angle θ1 of up to 135 degrees. FIG. 6 illustrates the case where the tilt angle θ1 is 90 degrees.

The camera housing 1300 incorporates therein the camera 112 (FIG. 7) that takes an image of an object. The object may be a part of a user, document, or a room where the terminal 10 is located. The camera housing 1300 is provided with a torque hinge 1310. The camera housing 1300 is fixed to the arm 1200 through the torque hinge 1310. With the torque hinge 1310, the camera housing 1300 can be rotated with respect to the arm 1200, in the direction of up, down, right, and left, such that the camera housing 1300 is kept at a desired position. More specifically, the camera housing 1300 can be rotated, while making a pan angle θ2 from about −180 degrees to 180 degrees in the direction right and left, and a tilt angle θ3 that ranges from about −45 degrees to +45 degrees in the direction of up and down. In FIG. 6, the pan angle θ2 and the tilt angle θ3 are each 0 degree.

The relay device 30, the management system 50, the program providing system 90, and the maintenance system 100 are each implemented by any desired number of general-purpose computers such as a personal computer or a server computer. For simplicity, explanation of the outer appearance of the computer is omitted.

FIG. 7 is a schematic block diagram illustrating a hardware structure of the communication terminal 10. As illustrated in FIG. 7, the terminal 10 includes a central processing unit (CPU) 101, a read only memory (ROM) 102, a random access memory (RAM) 103, a flash memory 104, a solid state drive (SSD) 105, a medium drive 107, the operation button 108, the power switch 109, a network interface (I/F) 111, the camera 112, an imaging element interface (I/F) 113, the microphone 114, the speaker 115, a sound input/output interface (I/O I/F) 116, the display interface (I/F) 117, the outside device connection interface (I/F) 118, and an alarm lamp 119, which are electrically connected through a bus 110 such as an address bus or data bus. The CPU 101 controls entire operation of the terminal 10. The ROM 102 stores therein a control program for execution by the CPU 101, such as an initial program loader (IPL). The RAM 103 functions as a work area of the CPU 101. The flash memory 104 stores therein various data such as the terminal control program, image data, or sound data such as voice data. The SSD 105 controls reading or writing of various data with respect to the flash memory 104 under control of the CPU 101. The medium drive 107 controls reading or writing of various data with respect to a removable recording medium 106 such as a flash memory. The operation button 108 allows the user to input a user instruction, for example, by allowing the user to select a communication destination such as the counterpart terminal 10. The power switch 109 allows the user to switch on or off the power of the terminal 10. The network I/F 111 allows the terminal 10 to transmit data through the communications network 2.

The camera 112 takes an image of an object to obtain image data under control of the CPU 101. The imaging element I/F 113 controls operation of the camera 112. The microphone 114 catches sounds such as voice of the user at the terminal 10. The speaker 115 outputs sounds such as sounds generated based on voice of the user at the counterpart terminal 10. The sound I/O I/F 116 controls input or output of sound signals such as voice signals with respect to the microphone 114 and the speaker 115 under control of the CPU 101. The display I/F 117 transmits image data to the display 120 under control of the CPU 101. The outside device connection I/F 118 controls connection of the terminal 10 to various types of outside device. The alarm lamp 119 generates notification when an error is detected in the terminal 10.

The display 120 may be implemented by a liquid crystal display (LCD) or an organic light emitting display, which displays various data such as an image of an object or an operation icon. As illustrated in FIGS. 6 and 7, the display 120 is connected to the display I/F 117 through the cable 120c. The cable 120c may be implemented by an analog RCB (VGA) signal cable, a component video cable, a high-definition multimedia interface (HDMI) signal cable, or a digital video interactive (DVI) signal cable.

The camera 112 includes a plurality of devices such as a lens system, and a solid-state image sensing device that photo-electrically converts a light to generate an image of an object. For example, the solid-state image sensing device includes a complementary metal oxide semiconductor (CMOS) or a charge coupled device (CCD).

The outside device connection I/F 118 may be connected to an outside device such as an external camera, external microphone, or external speaker through a universal serial bus (USB) cable that is connected through the port 1132 of the body 1100 (FIG. 6). When the external camera is connected to the terminal 10, the CPU 101 causes the terminal 10 to capture an image using the external camera, rather than the camera 112 that is incorporated in the terminal 10. When the external microphone or the external speaker is connected to the terminal 10, the CPU 101 causes the terminal 10 to use the external microphone or the external speaker in replace of the incorporated microphone 114 or the incorporated speaker 115.

The recording medium 106, which can be freely attached to or detached from the terminal 10, includes any desired type of recording medium. In alternative to the flash memory 104, any nonvolatile memory that is readable and writable under control of the CPU 101 may be used such as Electrically Erasable and Programmable ROM (EEPROM).

The terminal control program may be written onto a recording medium that is readable by a general-purpose computer such as the recording medium 106 in any format that is installable or executable by a general-purpose computer. Once the terminal control program is written onto the recording medium, the recording medium may be distributed. Further, the terminal control program may be stored in any desired memory other than the flash memory 104, such as the ROM 102.

Figure 8:
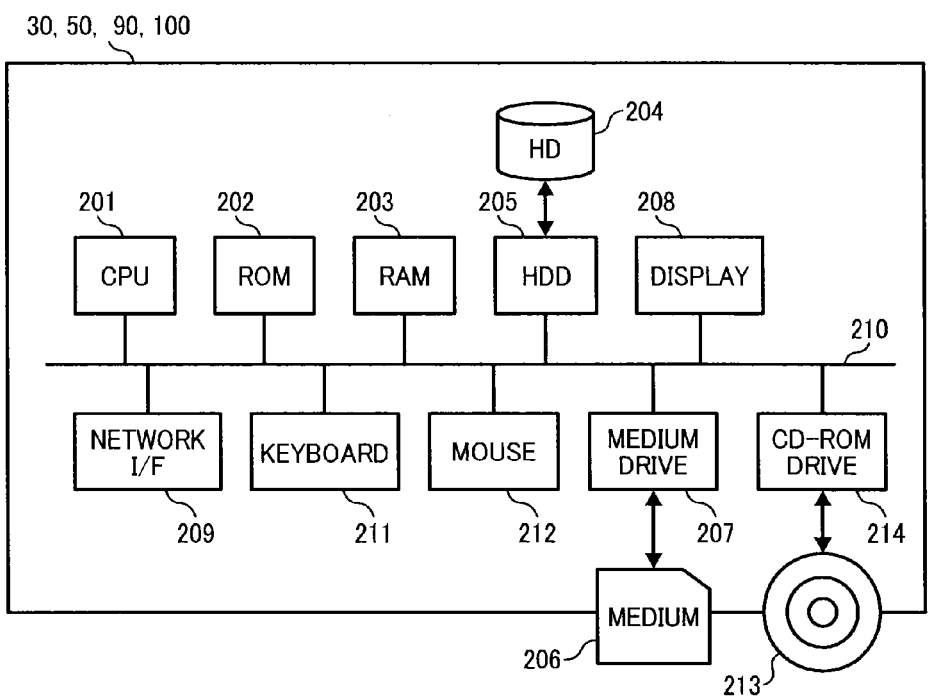
FIG. 8 is a schematic block diagram illustrating a hardware structure of any one of the communication management system, relay device, program providing system, and maintenance system of the communication system of FIG. 1.

FIG. 8 illustrates a hardware structure of the management system 50 of FIG. 1. The management system 50 includes a CPU 201, a ROM 202, a RAM 203, the HID 204, a hard disk drive (HDD) 205, a medium drive 207, a display 208, a network interface (I/F) 209, a keyboard 211, a mouse 212, and a CD-ROM drive 214, which are electrically connected through a bus 210 such as an address bus or a data bus.

The CPU 201 controls entire operation of the management system 50. The ROM 202 stores a control program for execution by the CPU 201, such as an IPL. The RAM 203 functions as a work area of the CPU 201. The RD 204 stores therein various data such as the transmission management program. The HDD 205 controls reading or writing of various data with respect to the HD 204 under control of the CPU 201. The medium drive 207 controls reading or writing of various data with respect to a removable recording medium 206 such as a flash memory. The display 208 displays various data such as a cursor, menu, window, character, or image. The network I/F 209 allows the management system 50 to transmit data through the communications network 2. The keyboard 211 includes a plurality of keys, each of which is used for inputting a user instruction through a character, a numeral, or a symbol. The mouse 212 allows the user to input a user instruction including, for example, selection or execution of a specific instruction, selection of an area to be processed, and instruction of cursor movement. The CD-ROM drive 214 controls reading or writing of various data with respect to a CD-ROM 213. In alternative to the CD-ROM 213, any removable recording medium may be used.

The communication management program may be written onto a recording medium that is readable by a general-purpose computer such as the recording medium 206 or the CD-ROM 213 in any format that is installable or executable by a general-purpose computer. Once the communication management program is written onto the recording medium, the recording medium may be distributed. Further, the communication management program may be stored in any desired memory other than the HD 204, such as the ROM 202.

The relay device 30 is substantially similar in hardware structure to the management system 50 of FIG. 8, except for replacement of the management program with a relay device control program that is used for controlling the relay device 30. The relay device control program may be written onto a recording medium that is readable by a general-purpose computer such as the recording medium 206 or the CD-ROM 213 in any format that is installable or executable by the general-purpose computer. Once the relay device control program is written onto the recording medium, the recording medium may be distributed. Further, the relay device control program may be stored in any desired memory other than the HD 204, such as the ROM 202.

The program providing system 90 is substantially similar in hardware structure to the management system 50 of FIG. 8, except for replacement of the management program with a program providing program that is used for controlling the program providing system 90. The program providing program may be written onto a recording medium that is readable by a general-purpose computer such as the recording medium 206 or the CD-ROM 213 in any format that is installable or executable by the general-purpose computer. Once the program providing program is written onto the recording medium, the recording medium may be distributed. Further, the program providing program may be stored in any desired memory other than the HD 204, such as the ROM 202.

The maintenance system 100 is substantially similar in hardware structure to the management system 50 of FIG. 8, except for replacement of the management program with a maintenance program that is used for controlling the maintenance system 100. The maintenance program may be written onto a recording medium that is readable by a general-purpose computer such as the recording medium 206 or the CD-ROM 213 in any format that is installable or executable by the general-purpose computer. Once the maintenance program is written onto the recording medium, the recording medium may be distributed. Further, the maintenance program may be stored in any desired memory other than the HD 204, such as the ROM 202.

Other examples of removable recording medium, which may be used in replace of the CD-ROM 213, include, but not limited to, compact disc recordable (CD-R), digital versatile disk (DVD), and blue ray disc.

<Functional Structure of Communication System>

Figure 9:
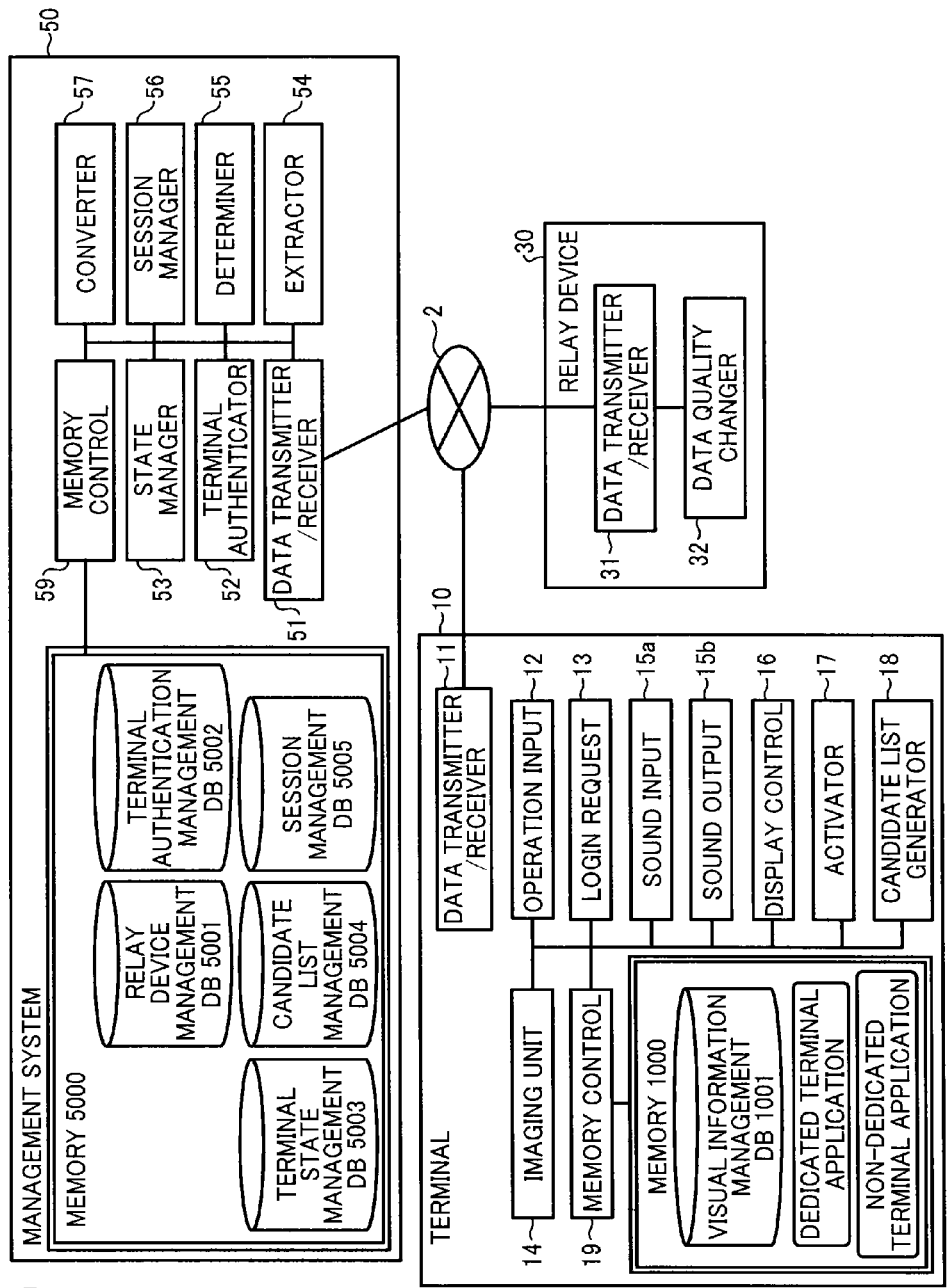
FIG. 9 is a schematic block diagram illustrating a functional structure of the communication terminal, relay device, and communication management system of the communication system of FIG. 1.

Next, a functional structure of the communication system of FIG. 1 is explained according to an example embodiment of the present invention. FIG. 9 is a schematic block diagram illustrating functional structure of the communication system 1. As illustrated in FIG. 9, the terminal 10, the relay device 30, and the management system 50 exchange data with one another through the communications network 2. In FIG. 9, the program providing system 90 and the maintenance system 100 of FIG. 1 are omitted.

<Functional Structure of Terminal>

The terminal 10 includes a data transmitter/receiver 11, an operation input 12, a login request 13, an imaging unit 14, a sound input 15a, a sound output 15b, a display control 16, an activator 17, a candidate list generator 18, and a memory control 19. These units shown in FIG. 9 correspond to a plurality of functions or functional modules, which are executed according to an instruction of the CPU 101 (FIG.

7) that is generated according to the terminal control program being loaded from the flash memory 104 onto the RAM 103.

The terminal 10 further includes a memory 1000 that may be implemented by the RAM 103 or the flash memory 104 of FIG. 7. The memory 1000 includes a visual information management database (DB) 1001, which is implemented by a visual information management table. The memory 1000 further stores dedicated terminal application that activates the dedicated terminal communication function of the terminal 10, and non-dedicated terminal application that activates the non-dedicated terminal communication function of the terminal 10.

(Visual Information Management Table)

FIG. 10 illustrates an example data structure of the visual information management table. The visual information management table of FIG. 10 stores, for each one of operation state information indicating an operation state of the counterpart terminal, visual information to be displayed on the display 120 in the form of candidate list. In this example, the visual information is expressed as an icon representing a specific operation state of the terminal as illustrated in FIG. 10. The terminal 10 may obtain visual information to be stored in the visual information management table of FIG. 10 from the management system 50, for example, as a response in response to the login request information transmitted from the terminal 10 (S22 of FIG. 16) or the candidate list request information transmitted from the terminal 10 (S41 of FIG. 17). Alternatively, the visual information may be previously stored in the memory 1000, before the terminal 10 is shipped to the user's site.

In this example, the visual information is mainly classified into first visual information that visually indicates that a communications protocol used by the counterpart terminal is the same as a communications protocol used by the request terminal (dedicated terminal), and second visual information that visually indicates that a communications protocol used by the counterpart terminal is different from a communications protocol used by the request terminal (dedicated terminal). The first visual information and the second visual information are respectively designed such that the user can easily notice the difference in appearance when they are displayed. Further, in this example, the first visual information mainly includes first visual information indicating that the operation state of the counterpart terminal is online and available for communication ("online, communication OK"), first visual information indicating that the operation state of the counterpart terminal is online and communicating ("online, communicating"), first visual information indicating that the operation state of the counterpart terminal is online but interrupted ("online, interrupted"), and first visual information indicating that the operation state of the counterpart terminal is offline ("offline").

The second visual information indicates that the encoding format differs between the request terminal and the counterpart terminal. In one example, assuming that the request terminal 10 and the counterpart terminal 10 are each implemented by the dual-codec terminal provided with the dedicated terminal communication function and the non-dedicated terminal communication function, the second visual information indicates that the counterpart terminal 10 is activating the non-dedicated terminal communication function, when the request terminal is activating the dedicated terminal communication function.

Referring now to FIGS. 7 and 9, a functional structure of the terminal 10 is explained according to an example embodiment of the present invention. More specifically, in this example, the operations or functions that are performed by the terminal 10, which include the operations or functions performed by the units shown in FIG. 9, are performed in cooperation with one or more hardware devices of the terminal 10 that are shown in FIG. 7.

The data transmitter/receiver 11, which may be implemented by the network I/F 111 (FIG. 7) under control of the CPU 101, transmits or receives various data or information to or from another terminal, device, or system, through the communications network 2. In this example, the data transmitter/receiver 11 starts receiving the operation state information that indicates the operation state of each candidate counterpart terminal 10 from the management system 50, before starting communication with any counterpart terminal 10. The operation state of the candidate terminal 10 indicates whether the candidate terminal 10 is online or offline. When the terminal 10 is online, the operation state of the candidate terminal 10 further indicates whether the candidate terminal 10 is available for communication ("communication OK"), the candidate terminal 10 is having communication with the other terminal ("communicating"), or the candidate terminal 10 is not available as the user leaves the seat. The operation state of the candidate terminal 10 may further indicate whether the candidate terminal 10 is online but in trouble or error ("online, communicating, trouble"), the candidate terminal 10 is online but not capable of outputting image data such that only sound data is output, or the candidate terminal 10 is online but in mute state ("online, mute") such that sound data is not output. For example, when the cable 120c is disconnected from the terminal 10, the operation state of the candidate terminal 10 is assumed to be in the trouble state. For the descriptive purposes, in the following examples, it is assumed that the operation state information indicates whether the candidate terminal 10 is online or offline, and if online, whether the candidate terminal 10 is available for communication, for example, as described above referring to FIG. 10. Further, in this example, the operation state information indicates whether the non-dedicated terminal communication function is activated, in case the terminal 10 is the dual-codec terminal.

The operation input 12 receives a user instruction input by the user through the operation button 108 or the power switch 109 (FIG. 7), under control of the instructions received from the CPU 101. For example, when the user selects "ON" using the power switch 109, the operation input 12 receives a user instruction for turning the power on, and causes the terminal 10 to turn on the power.

The operations or functions of the login request 13 are performed according to an instruction received from the CPU 101 (FIG. 7). When the power of the terminal 10 is turned on, the login request 13 automatically causes the data transmitter/receiver 11 to send login request information that requests the login process, and a current IP address of the terminal 10, to the management system 50 through the communications network 2. When the power of the terminal 10 is turned off according to a user instruction received from the user through the power switch 109, the login request 13 causes the data transmitter/receiver 11 to send current operation state information of the terminal 10 to the management system 50, which indicates that the power of the terminal 10 is turned off. After the operation state information is sent, the operation input 12 turns off the power of the terminal 10. As the operation state information of the terminal 10 is sent every time the power is turned off, the management system 50 is able to know that the terminal 10 is offline in realtime.

The operations or functions of the imaging unit 14 of the terminal 10 are performed by the camera 112 and the imaging element I/F 113 according to an instruction received from the CPU 101 (FIG. 7). The imaging unit 14 takes an image of an object to output image data of the object.

The operations or functions of the sound input 15a of the terminal 10 are performed by the sound I/O I/F 116 according to an instruction received from the CPU 101, in cooperation with the microphone 114. After the microphone 114 converts sounds of the user at the terminal 10 to a sound signal, the sound input 15a inputs the sound signal in the form of sound data for further processing. The operations or functions of the sound output 15b of the terminal 10 are performed by the sound I/O I/F 116 according to an instruction received from the CPU 101, in cooperation with the speaker 115. The sound output 15b outputs a sound signal of sound data that is received from the counterpart terminal 10 through the speaker 115.

The operations or functions of the display control 16 of the terminal 10 of FIG. 9 are performed by the display I/F 117 according to an instruction received from the CPU 101 (FIG. 7). The display control 16 controls transmit of image data, which is generated based on image data of different resolutions, to the display 120. The display control 16 further causes the display 120 that is provided for the request terminal 10 to display a candidate list before the request terminal 10 starts videoconference with a desired counterpart terminal 10. The display control 16 may search the visual information management table (FIG. 10) using the operation state information received from the management system 50 as a search key to extract visual information that corresponds to the operation state specified by the operation state information, and causes the display 120 to display an image based on the extracted visual information as a candidate list.

The activator 17, which may be implemented by the instructions received from the CPU 101 (FIG. 7), determines whether the data transmitter/receiver 11 receives a request for starting communication from the counterpart terminal 10, such as the dedicated terminal 10 or the terminal 10 executing the dedicated terminal communication function. In another example, the activator 17 activates one of the dedicated terminal communication function or the non-dedicated terminal communication function. In another example, the activator 17 stops execution of the dedicated terminal communication function or the non-dedicated terminal communication function, which is being activated. For example, the activator 17 performs various operation in cooperation with the dedicated terminal application or the non-dedicated terminal application.

The candidate list generator 18, which may be implemented by the instructions received from the CPU 101 (FIG. 7), generates or updates a candidate list that reflects the operation state of the candidate counterpart terminal 10 based on the candidate list information and the terminal state information that are respectively received from the management system 50. As described below, the candidate list generator 18 searches the visual information management table (FIG. 10) based on the terminal state information to extract visual information that is associated with the terminal state information. The candidate list generator 18 displays an image reflecting the extracted visual information within the candidate list frame for the terminal ID and the terminal name of each candidate counterpart terminal.

The memory control 19 is implemented by the SSD 105 of FIG. 7 according to an instruction received from the CPU 101. The memory control 19 stores various data in the memory 1000, or reads out various data from the memory 1000. The memory 1000 stores therein various data such as terminal identification (ID) information for identifying the terminal 10, and a password for authenticating a user at the terminal 10. The memory 1000 further stores therein image data and/or sound data that is received as the terminal 10 communicates with a counterpart terminal 10 such that the image data and/or sound data are overwritten. Before the image data is overwritten, an image generated based on the image data is displayed onto the display 120. Before the sound data is output, sounds generated based on the sound data is output through the speaker 150.

In this example, any one of the terminal ID of the terminal 10 and the relay device ID of the relay device 30 includes any type of identification information that can be expressed by any language, character, symbol, mark, or any combination of language, character, symbol, and mark.

<Functional Structure of Relay Device>

Now, a functional structure of the relay device 30 is explained. The relay device 30 includes a data transmitter/receiver 31 and a data quality changer 32. These units shown in FIG. 9 correspond to a plurality of functions or functional modules, which are executed according to an instruction of the CPU 201 (FIG. 8) that is generated according to the relay device control program being loaded from the HD 204 onto the RAM 203.

(Functional Structure of Relay Device)

Next, a functional structure of the relay device 30 is explained according to an example embodiment of the present invention. More specifically, in this example, the operations or functions that are performed by the relay device 30, which include the operations or functions performed by the units shown in FIG. 9, are performed in cooperation with one or more hardware devices of the relay device 30 that are shown in FIG. 8.

The data transmitter/receiver 31, which may be implemented by the network I/F 209 (FIG. 8), transmits or receives various data or information to or from another terminal, device, or system, through the communications network 2, under control of instructions received from the CPU 201. The relay device 30 relays contents data between or among the plurality of terminals 10.

Further, the data transmitter/receiver 31 initializes a communication session for the relay device 30. More specifically, the data transmitter/receiver 31 transmits session start request information, which instructs to start a communication session (the first communication session "sed1"), to a counterpart terminal 10 having the IP address that is received at the data transmitter/receiver 31. The data transmitter/receiver 31 transmits session start request information instructing to start a communication session (the second communication session "sed2"), to a counterpart terminal 10 having the IP address that is received at the data transmitter/receiver 31.

The data quality changer 32, which may be implemented by the CPU 201 of FIG. 8, changes the quality of image data received from the request terminal 10 before transmitting the image data to the counterpart terminal 10. For example, reception of image data at the terminal 10 may delay due to the increased load on the communication network 2. In such case, the relay device 30 may lower the quality of the image data to be relayed. For example, assuming that reception of the image data is delayed, the data quality changer 32 determines to stop relaying high-resolution image data of FIG. 3C, thus reducing the load on the communication network 2.

<Functional Structure of Management System>

The management system 50 includes a data transmitter/receiver 51, a terminal authenticator 52, a state manager 53, an extractor 54, a determiner 55, a session manager 56, a converter 57, and a memory control 59. These units shown in FIG. 9 correspond to a plurality of functions or functional modules, which are executed according to an instruction of the CPU 201 (FIG. 8) that is generated according to the transmission management program being loaded from the HD 204 onto the RAM 203. The management system 50 further includes a memory 5000, which may be implemented by the HD 204 (FIG. 8). The memory 500 stores various databases, candidate list frame data, and conversion rule data to be used for converting the call control protocol.

(Relay Device Management Table)

The memory 5000 includes a relay device management database (DB) 5001, which stores therein a relay device management table of FIG. 11. The relay device management table of FIG. 11 stores, for each relay device ID of the relay device 30, the operation state of the relay device 30, the received date and time at which the management system 50 receives the operation state information indicating the operation state of the relay device 30 from the relay device 30, the IP address of the relay device 30, and the maximum data transmission speed of the relay device 30 in Mbps. For example, for the relay device 30a having the relay terminal ID "111a", the relay device management table of FIG. 11 indicates that the operation state is "ON LINE", the received date and time at which the management system 50 receives the operation state information is "13:00 PM of Nov. 10, 2011", the IP address of the relay device 30a is "1.2.1.2", and the maximum data transmission speed of the relay terminal 30a is 100 Mbps.

(Terminal Authentication Management Table)

The memory 5000 further includes a terminal authentication management database (DB) 5002, which stores a terminal authentication management table of FIG. 12. The terminal authentication management table of FIG. 12 stores a plurality of terminal IDs respectively assigned to the terminals 10 that are managed by the management system 50, in association with a plurality of passwords that are previously determined for the respective terminals 10. For example, referring to the terminal authentication management table of FIG. 12, the terminal 10aa having the terminal ID "01aa" is assigned with the password "aaaa".

(Terminal State Management Table)

The memory 5000 further includes a terminal state management database (DB) 5003, which stores a terminal state management table of FIG. 13. The terminal state management table of FIG. 13 stores, for each one of the terminal IDs assigned to the terminals 10, the terminal name of the terminal 10, the operation state of the terminal 10, the received date and time at which the management system 50 receives the login request information from the terminal 10, and the IP address of the terminal 10. For example, for the terminal 10aa having the terminal ID "01aa", the terminal state management table of FIG. 13 indicates that the terminal name is "Japan Tokyo Office AA terminal", the operation state is online ("ONLINE") and is available for communication ("COMMUNICATION OK"), the received date and time is "13:40 PM, Nov. 10, 2011", and the IP address of the terminal 10aa is "1.2.1.3".

In this example, the terminal state management table of FIG. 13 only manages information regarding the dedicated terminal 10 or the dual-codec terminal 10 having the dedicated terminal communication function. That is, information regarding the non-dedicated terminal 10, such as the terminal ID, the terminal name, the received date/time, or the IP address, is not managed.

(Candidate List Management Table)

The memory 5000 further includes a candidate list management database (DB) 5004, which stores a candidate list management table of FIG. 14. The candidate list management table of FIG. 14 stores, for each one of a plurality of request terminals 10 capable of requesting for communication, the terminal ID of the request terminal 10, and one or more terminal IDs that are respectively assigned to candidate terminals 10 that are previously registered for the request terminal 10. For example, the candidate list management table of FIG. 14 indicates that the request terminal 10aa having the terminal ID "01aa" is most likely to request for videoconference with respect to the terminal 10ab having the terminal ID "01ab", the terminal 10ba having the terminal ID "01ba", and the terminal 10ca having the terminal ID "01ca", etc. The management system 50 manages the candidate list management table of FIG. 14, for example, according to a user instruction received from any one of the terminals 10. For example, in response to a user instruction received from the terminal 10aa, the management system 50 may add or delete the contents of the candidate list management table of FIG. 14. In this example, the candidate list management table of FIG. 14 does not manage the non-dedicated terminal 10 such that the terminal ID of the non-dedicated terminal 10 is not stored.

(Session Management Table)

The memory 5000 further includes a session management database (DB) 5005, which stores a session management table of FIG. 15. The session management table of FIG. 15 stores information regarding each of the sessions that are carried out by at least two terminals 10 of the communication system 1 for the purpose of selecting the relay device 30 that is most suitable for communication between at least two terminals 10. More specifically, for each session, the session management table of FIG. 15 stores a relay device ID of the relay device 30 to be used for transmitting or receiving contents data such as image data and sound data, a terminal ID of the request terminal 10, a terminal ID of the counterpart terminal 10, a delay time ms indicating a time period required for receiving contents data at the counterpart terminal 10, and the date and time information indicating the time at which the management system 50 receives delay information from the counterpart terminal 10.

For example, referring to the session management table of FIG. 15, the relay device 30a having the relay device ID "111a" is selected to relay image data and sound data between the request terminal 10aa having the terminal ID "01aa" and the counterpart terminal 10ca having the terminal ID "01ca". Further, the management system 50 receives the delay information from the counterpart terminal 10ca at 14:00 PM, Nov. 10, 2011. Based on the delay information, the delay time ms of 200 milliseconds (ms) is obtained. In case of having videoconference between only two terminals 10, the time at which the delay time is received may be determined based on the time when the management system 50 receives the delay information transmitted from the request terminal 10 rather than based on the time when the management system 50 receives the delay information transmitted from the counterpart terminal 10. In case of having videoconference with more than two terminals 10, the delay information transmitted from the counterpart terminal 10 that receives the image data and sound data is used to manage the date and time at which the delay information is received.

(Functional Structure of Management System)

Referring back to FIG. 9, a functional structure of the management system 50 is explained. The data transmitter/receiver 51, which may be implemented by the network I/F 209 (FIG. 8) according to an instruction received from the CPU 201, transmits or receives various data or information to or from another terminal, device, or system through the communications network 2.

Under control of the CPU 201 (FIG. 8), the terminal authenticator 52 obtains a terminal ID and a password from the login request information that is received from the data transmitter/receiver 51. Using the terminal ID and the password as a search key, the terminal authenticator 52 searches the terminal authentication management DB 5002 (FIG. 12) to determine whether the obtained set of terminal ID and password is registered. Based on the search result, the terminal authenticator 52 determines whether the user at the terminal 10 or the terminal 10 is allowed for access.

The state manager 53, which operates according to an instruction received from the CPU 201 (FIG. 8), manages the operation state of the request terminal 10 that sends the login request information using the terminal state management DB 5003 (FIG. 13). More specifically, the state manager 53 stores the terminal ID of the request terminal 10, the operation state of the request terminal 10, the date and time at which the management system 50 receives the login request information from the request terminal 10, and the IP address of the request terminal 10. When the power switch 109 is changed from the "ON" state to the "OFF" state by the user, the state manager 53 receives the operation state information indicating that the power is turned off from the terminal 10, and changes the operation state of the terminal 10 from the "online" state to the "offline" state in the terminal state management table of FIG. 13.

The extractor 54, which operates according to an instruction received from the CPU 201 (FIG. 8), searches various management databases in the memory 5000 using a search key to obtain data that is associated with the search key.

For example, the extractor 54 searches the candidate list management DB 5004 (FIG. 14) using the terminal ID of the request terminal 10 that sends the login request information as a search key to obtain a list of terminal IDs each assigned to a plurality of candidate terminals 10 each associated with the request terminal 10. Further, the extractor 54 searches the terminal state management DB 5003 (FIG. 13) using the terminal ID of each candidate terminal 10 that is extracted from the candidate list management DB 5004 as a search key to obtain the operation state information of each candidate terminal 10. Accordingly, the extractor 54 obtains the operation state of each of the candidate terminals 10, which are previously associated with the request terminal 10 that sends the login request information. The operation state information of each of the candidate terminals 10 is transmitted to the request terminal 10 for display such that the user at the request terminal 10 is able to know the operation state of each of the candidate terminals 10.

Additionally, the extractor 54 searches the candidate list management DB 5004 (FIG. 14) using the terminal ID of the request terminal 10 as a key to obtain a terminal ID of another request terminal 10 that registers the request terminal 10 as a candidate terminal for another request terminal 10. The extractor 54 searches the terminal state management DB 5003 (FIG. 13) using the terminal ID that is extracted as a key to obtain the operation state information of the request terminal 10 that sends the login request information. The operation state information of the request terminal 10 is transmitted to another request terminal 10 for display such that the user at another request terminal 10 is able to know the operation state of the request terminal 10.

In another example, the extractor 54 searches the terminal state management table (FIG. 13) using the terminal ID of the counterpart terminal 10, which may be received at the data transmitter/receiver 51, to extract the IP address of the counterpart terminal 10. Using the IP address of the counterpart terminal 10 as a search key, the management system 50 extracts the terminal ID of the counterpart terminal 10 that is associated with the IP address from the terminal state management table (FIG. 13).

The determiner 55, which operates according to an instruction received from the CPU 201 (FIG. 8), determines whether to transmit operation state information to a specific terminal 10, based on the operation state of the specific terminal 10. When it is determined that the operation state of the specific terminal 10 is online, the determiner 55 determines to send the operation state information to the specific terminal 10. When it is determined that the operation state of the specific terminal 10 is not online, the determiner 55 determines not to send the operation state information to the specific terminal 10.

The session manager 56, which operates according to an instruction received from the CPU 201 (FIG. 8), stores the relay device ID of the relay device 30 for relaying contents data, the terminal ID of the request terminal 10, the terminal ID of the counterpart terminal 10, the delay time "ms" indicating delay in time at which the image data is received at the counterpart terminal 10, and the received date and time at which the delay time information transmitted from the counterpart terminal is received at the management system 50, in a corresponding manner, in the session management DB 5005 (FIG. 15) of the memory 5000. The session manager 56 further generates a session ID for identifying a session to be used for establishing the communication session, such as the contents data communication session.

The converter 57 accesses the terminal state management table (FIG. 13) to determine whether the operation state of the terminal ID of the request terminal 10 indicates that the non-dedicated terminal communication function is activated. When the non-dedicated terminal communication function is activated, the converter 57 executes the call control process according to the conversion rule data stored in the memory 5000. More specifically, the converter 57 switches the call control protocol between a call control protocol of data transmitted from the request terminal 10 and a call control protocol of data transmitted from the counterpart terminal 10.

The memory control 59, which operates according to an instruction received from the CPU 201 (FIG. 8) in cooperation with the HDD 205 (FIG. 8), stores various data in the memory 5000 or read out various data from the memory 5000.

<Operations of Communication System>

Referring now to FIGS. 6, 9, and 16 to 18, operation of displaying a candidate list before starting communication with a counterpart terminal 10, performed by the communication system 1, is explained according to an example embodiment of the present invention. In the following examples, it is assumed that the request terminal 10aa is the dual-codec terminal having the dedicated terminal communication function and the non-dedicated terminal communication function.

Figure 16:
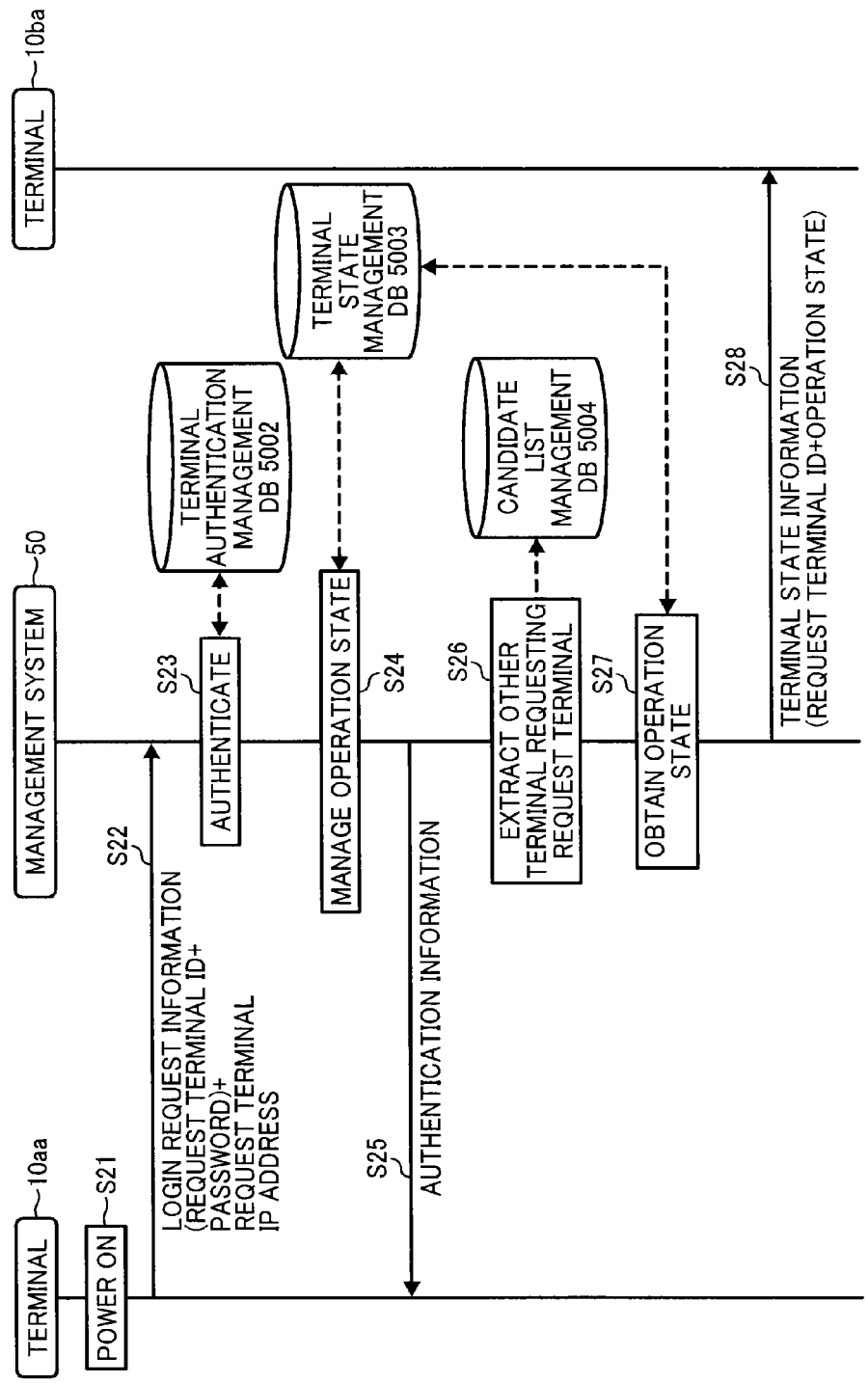
FIG. 16 is a data sequence diagram illustrating operation in prior to establishing communication among two or more terminals of the communication system of FIG. 1, performed by the communication system of FIG. 1, according to an example embodiment of the present invention.
Figure 17:
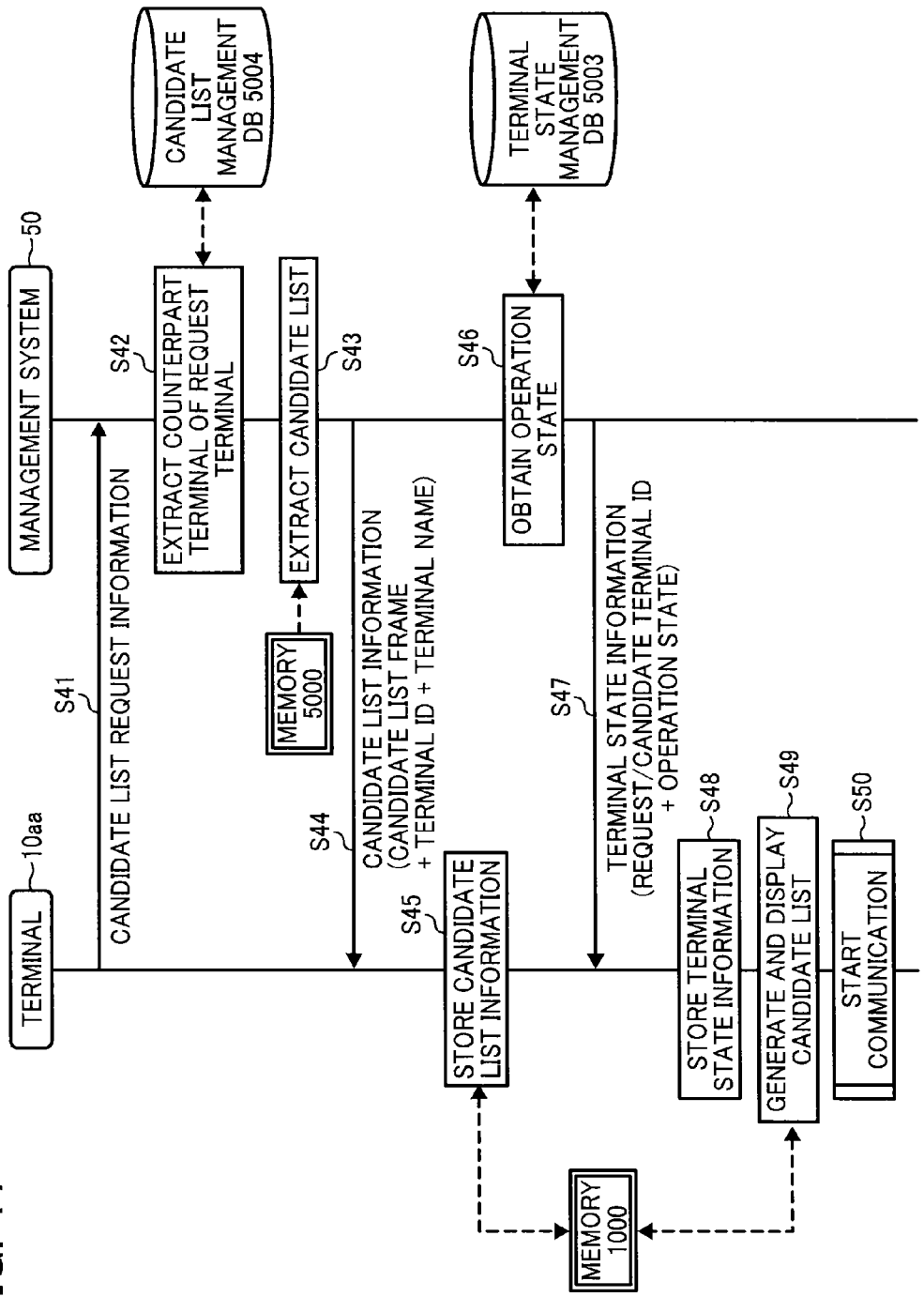
FIG. 17 is a data sequence diagram illustrating operation of displaying a candidate list, performed by the communication system of FIG. 1, according to an example embodiment of the present invention.
Figure 18:
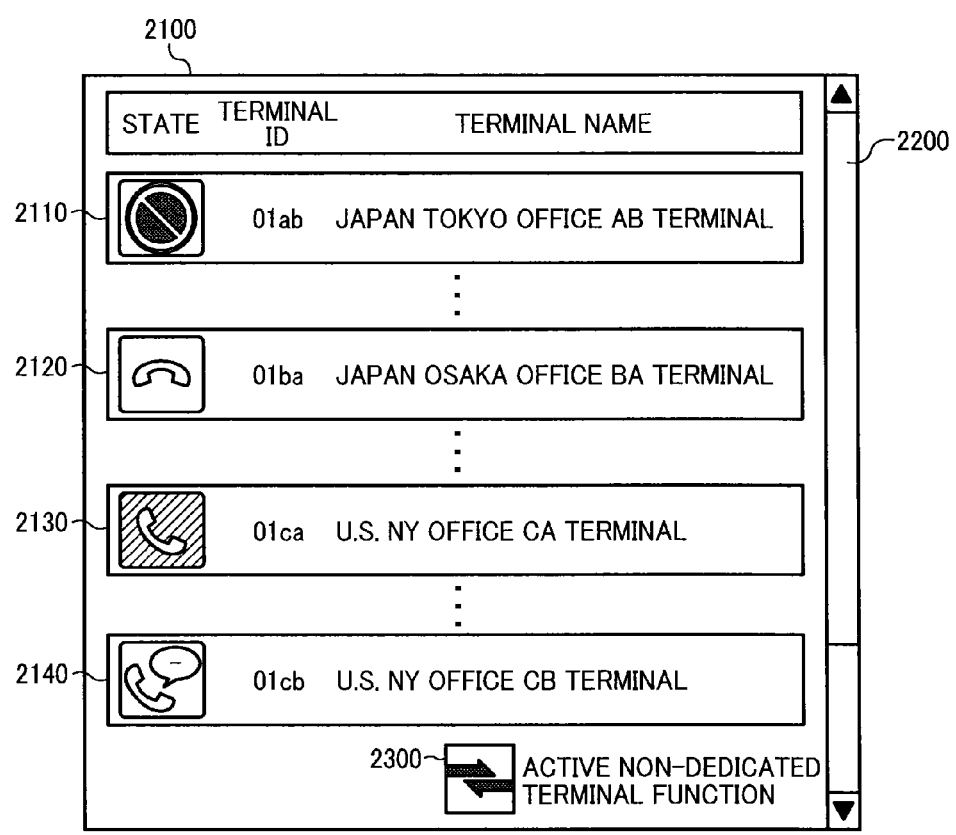
FIG. 18 is an illustration of an example screen displaying a candidate list, according to an example embodiment of the present invention.

FIGS. 16 and 17 are a data sequence diagram illustrating operation of processing a request for logging in and displaying a candidate list, which are generated by the request terminal 10*aa*, according to an example embodiment of the present invention. FIG. 18 is an illustration of an example screen displaying the candidate list.

At S21, the user at the request terminal 10*aa*, which is the dual-codec terminal 10, turns on the power of the request terminal 10*aa* through the power switch 109 (FIG. 6). The operation input 12 (FIG. 9) of the request terminal 10*aa* turns on the power of the request terminal 10*aa*.

At S22, as the power of the request terminal 10*aa* is turned on, the login request 13 of the request terminal 10*aa* automatically causes the data transmitter/receiver 11 to send the login request information that request the login process to the management system 50 through the communications network 2. The login request information includes a terminal ID that identifies the request terminal 10*aa*, and a password assigned to the request terminal 10*aa*. The terminal ID and the password may be obtained by the memory control 19 from the memory 1000, and sent to the data transmitter/receiver 11. At the time of sending the login request information from the request terminal 10*aa* to the management system 50, the request terminal 10*aa* sends an IP address of the request terminal 10*aa* such that the management system 50 can obtain the IP address of the request terminal 10*aa*.

At S23, the terminal authenticator 52 of the management system 50 searches the terminal authentication management table (FIG. 12) stored in the memory 5000 using the terminal ID and the password of the login request information received through the data transmitter/receiver 51. When it is determined that the terminal ID and the password of the login request information is stored in the terminal authentication management DB 5002, the terminal authenticator 52 determines that the terminal 10*aa* is authenticated.

At S24, when the terminal authenticator 52 authenticates that the login request information is received from the authenticated terminal 10, the state manager 53 of the management system 50 stores the operation state, the date and time at which the login request information is received, and the IP address of the terminal 10*aa*, with respect to the terminal ID and the terminal name of the terminal 10*aa* in the terminal state management table (FIG. 13) to create a record of the terminal 10*aa*. Using the terminal state management table of FIG. 13, which stores the operations state of online, the date and time of "13:40, Nov. 10, 2011", and the terminal IP address of "1.2.1.3" in association with the terminal ID "01*aa*" and the terminal name "AA Terminal", various information regarding the terminal 10*aa* can be managed.

At S25, the data transmitter/receiver 51 of the management system 50 sends the authentication result obtained by the terminal authenticator 52 to the request terminal 10*aa* that has sent the login request information through the communications network 2. As described above, in this example, it is assumed that the terminal authenticator 52 determines that the terminal 10*aa* is an authenticated terminal.

At S26, the extractor 54 of the management system 50 searches the candidate list management table (FIG. 14) using the terminal ID "01*aa*" of the request terminal 10*aa* that has sent the login request information as a search key to extract a terminal ID of a terminal 10 that is previously registered the request terminal 10*aa* having the terminal ID "01*aa*" as a candidate terminal. For the descriptive purposes, it is assumed that the terminal ID extracted at S26 is the terminal ID "01*ba*" of the terminal 10*ba*.

At S27, the extractor 54 of the management system 50 searches the terminal state management table (FIG. 13) using the terminal ID "01*aa*" of the request terminal 10*aa* that has send the login request information as a search key to obtain the operation state of the request terminal 10*aa*.

At S28, the data transmitter/receiver 51 of the management system 50 transmits the terminal state information including the terminal ID "01*aa*" of the request terminal 10*aa* and the operation state information indicating the operation state of the request terminal 10*aa*, to the terminal 10*ba*. The terminal 10*ba*, which receives the terminal state information at the data transmitter/receiver 11, displays a candidate list that reflects the most updated operation state of the terminal 10*aa* on the display 120*ba*.

Assuming that the authentication result indicating that the terminal 10*aa* is an authenticated terminal is received at S25 of FIG. 16, at S41 of FIG. 17, the data transmitter/receiver 11 of the request terminal 10*aa* sends candidate list request information that requests for a candidate list, to the management system 50 through the communications network 2. The data transmitter/receiver 51 of the management system 50 receives the candidate list request information.

At S42, the extractor 54 of the management system 50 searches the candidate list table (FIG. 14) using the terminal ID "01*aa*" of the request terminal 10*aa* that has sent the candidate list information as a search key to obtain a terminal ID of a candidate counterpart terminal 10 that is previously registered for the request terminal 10*aa*. The extractor 54 further searches the terminal state management table (FIG. 13) using the extracted terminal ID of the candidate counterpart terminal 10 as a search key to obtain terminal name information associated with the extracted terminal ID. For the descriptive purposes, it is assumed that the terminal IDs "01*ab*", "01*ba*", and "01*ca*" of the terminal 10*ab*, 10*ba*, and 10*ca* each of which are the dedicated terminals, and the terminal ID "01*cb*" of the terminal 10*cb* that is the dual-codec terminal are extracted as the terminal ID of the candidate counterpart terminal 10.

At S43, the extractor 54 of the management system 50 reads out the candidate list frame data from the memory 5000. The data transmitter/receiver 51 transmits the candidate list frame, the terminal ID of each one of the candidate counterpart terminals 10 extracted at S42, and the terminal name of each one of the candidate counterpart terminals 10 extracted at S42, to the request terminal 10*aa*, as the candidate list information. The data transmitter/receiver 11 of the request terminal 10*aa* receives the candidate list information.

At S45, the memory control 19 of the request terminal 10*aa* stores the candidate list information in the memory 1000.

In this manner, rather than causing each terminal 10 to manage the candidate list information, the management system 50 centrally manages the candidate list information for all of the terminals 10 that are registered to the communication system 1. As the candidate list information is centrally managed at the management system 50, any change in the communication system 1 can be easily reflected in a timely manner without requiring the user at each terminal 10 to change any settings. For example, the management system 50 is able to update the candidate list information to reflect when a new terminal 10 is added to the communication system 1, when a new type of terminal 10 is introduced to the communication system 1, or when the design for the candidate list frame is changed.

At S46, the extractor 54 of the management system 50 extracts the operation state of each one of the candidate counterpart terminals 10.

At S47, the data transmitter/receiver 51 transmits the terminal state information, which includes the terminal ID and the operation state of each one of the candidate counterpart terminals 10, to the request terminal 10aa. More specifically, in this example, the data transmitter/receiver 51 transmits the terminal state information, which includes the candidate counterpart terminal ID that is used as the search key at S42 and the operation state of the candidate counterpart terminal 10, to the request terminal 10aa through the communications network 2. Alternatively, the data transmitter/receiver 51 may transmit the terminal state information, which includes the terminal ID of the request terminal 10aa and the operation state of the request terminal 10aa, to the request terminal 10aa, in addition to the terminal state information of the candidate counterpart terminals 10ab, 10ba, 10ca, and 10cb.

At S48, the memory control 19 of the request terminal 10aa stores the terminal state information received from the management system 50 in the memory 1000. Based on the terminal state information regarding the candidate counterpart terminal, the request terminal 10aa is able to know the current operation state of the counterpart terminal 10 capable of communicating with the request terminal 10aa.

At S49, the candidate list generator 18 of the request terminal 10aa generates a candidate list that reflects the operation state of the candidate counterpart terminal 10, based on the candidate list information and the terminal state information that are stored in the memory 1000. The display control 16 causes the display 120aa to display a candidate list screen.

For example, the operation state of the candidate counterpart terminal 10 may be reflected on the candidate list, as described below. The candidate list generator 18 searches the visual information management table (FIG. 10) based on the operation state information of the candidate counterpart terminal, which is included in the terminal state information, to obtain the visual information associated with the operation state. The candidate list generator 18 associates, for each of the candidate counterpart terminals 10, the visual information with the terminal ID and the terminal name, such that the visual information, the terminal ID, and the terminal name are to be arranged within the candidate list frame. In this example, the visual information is displayed in the form of icon. Assuming that the candidate list screen of FIG. 18 is displayed, four icons 2110, 2120, 2130, and 2140 of the candidate counterpart terminals 10 are displayed. Referring to FIG. 18, the icon 2110 indicates that the candidate counterpart terminal 10ab having the terminal ID "01ab" has the operation state "online, interrupt". The icon 2120 indicates that the candidate counterpart terminal 10ba having the terminal ID "01ba" has the operation state "offline". The icon 2130 indicates that the candidate counterpart terminal 10ca having the terminal ID "01ca" has the operation state "online, communication OK". The icon 2140 indicates that the candidate counterpart terminal 10cb having the terminal ID "01cb" has the operation state "non-dedicated terminal function", which indicates that the terminal 10cb is executing the non-dedicated terminal communication function.

With this visual information, the user at the request terminal 10aa is able to instantly recognize the operation state of the candidate counterpart terminal 10, before starting communication with the candidate counterpart terminal 10.

The candidate list screen 2100 further displays a switch icon 2300 at the lower section, which allows the user to switch between the dedicated terminal communication function and the non-dedicated terminal communication function. In this example, the switch icon 2300, when selected, causes the terminal 10aa to stop using the dedicated terminal communication function and execute the non-dedicated terminal communication function. For example, when the user wants to start communication with the terminal 10cb executing the non-dedicated terminal communication function, the user may select the switch icon 2300. The candidate list screen 2100 further displays a scroll bar 2200 at the right section. Through moving the scroll bar upward or downward, the candidate list screen of FIG. 18 displays different portion of the candidate list to change information regarding a set of candidate counterpart terminals being displayed on the screen, such as a set of icons.

Figure 19:
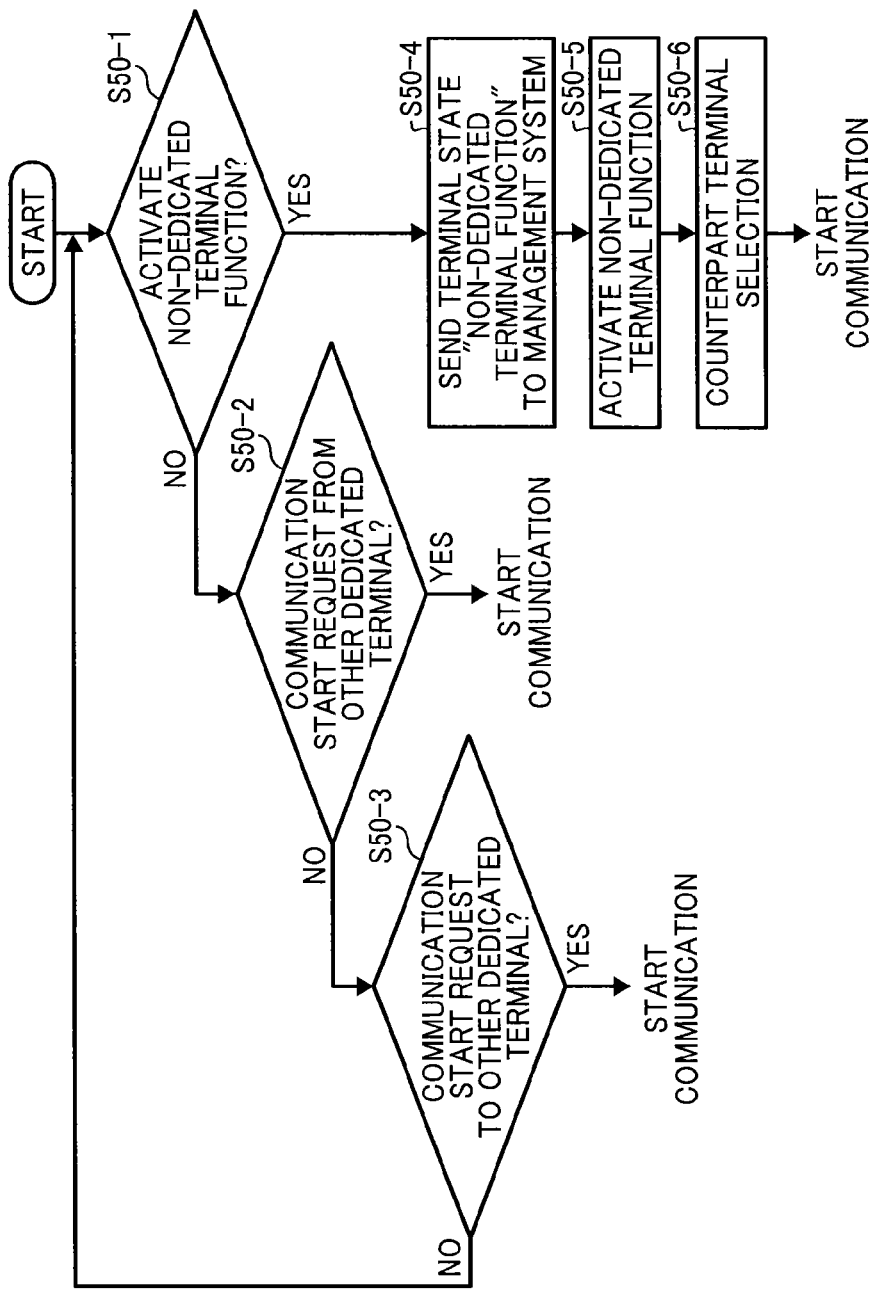
FIG. 19 is a flowchart illustrating operation of activating a non-dedicated terminal communication function, performed by the communication terminal of FIG. 1, according to an example embodiment of the present invention.

Referring now to FIG. 19, operation of activating the non-dedicated terminal communication function, performed by the request terminal 10aa executing the dedicated terminal communication function, is explained according to an example embodiment of the present invention. The operation of FIG. 19 may be performed when the request terminal 10aa is about to start communication, while the candidate list screen of FIG. 18 is being displayed.

At S50-1, the request terminal 10aa determines whether the user selects the switch icon 2300 of the candidate list screen of FIG. 18 through the operation input 12, which requests activation of the non-dedicated terminal communication function. When it is determined that request of activation of the non-dedicated terminal communication function is not received ("NO" at S50-1), the operation proceeds to S50-2.

At S50-2, the data transmitter/receiver 11 determines whether a communication start request for starting communication with the request terminal 10aa is received from any other counterpart terminal 10 that communicates using the communications protocol of the dedicated terminal. In this example, the terminal 10 communicating using the communications protocol of the dedicated terminal includes the dedicated terminal 10 and the dual-codec terminal 10 activating the dedicated terminal communication function. When it is determined that the communication start request is received ("YES" at S50-2), the request terminal 10aa starts communication while activating the dedicated terminal communication function. When it is determined that the communication start request is not received ("NO" at S50-2), the operation proceeds to S50-3.

At S50-3, the request terminal 10aa determines whether a communication start request for starting communication with any other counterpart terminal 10 that communicates using the communications protocol of the dedicated terminal is received at the operation input 12. When it is determined that the communication start request is received ("YES" at S50-3), the request terminal 10aa starts communication while activating the dedicated terminal communication function. When it is determine that the communication start request is not received ("NO" at S50-3), the operation returns to S50-1.

Referring back to S50-1, when it is determined that the switch icon 2300 is selected ("YES" at S50-1), the operation proceeds to S50-4. At S50-4, the data transmitter/receiver 11 of the request terminal 10aa transmits the terminal state information indicating that the non-dedicated terminal communication function is activated, to the management system 50. The management system 50 updates the operation state of the request terminal 10aa, which is stored in the terminal state management table (FIG. 13) in association with the terminal ID of the request terminal 10aa, to indicate that the non-dedicated terminal communication function is activated "non-dedicated terminal function".

At S50-5, the activator 17 of the request terminal 10aa stops the dedicated terminal communication function, and activates the non-dedicated terminal communication function. With activation of the non-dedicated terminal communication function, the request terminal 10aa is able to communicate with the non-dedicated terminal 10 or the terminal 10 executing the non-dedicated terminal communication function.

In case of communicating with the non-dedicated terminal 10, the candidate list screen of FIG. 18 does not display information regarding the non-dedicated terminal 10, since the management system 50 does not manage information regarding the non-dedicated terminal 10 such as the terminal ID of the non-dedicated terminal 10, or address information such as the IP address indicating the location of the non-dedicated terminal 10. In order to start communication with the non-dedicated terminal 10, the user at the request terminal 10aa inputs address information such as the IP address, which specifies the location of the counterpart non-dedicated terminal 10, for example, using the operation button 108. Based on the user input, at S50-6, the operation input 12 receives a user instruction for starting communication with the non-dedicated counterpart terminal 10. The request terminal 10aa starts communication with the counterpart non-dedicated terminal 10.

More specifically, the request terminal 10aa transmits a communication start request addressed to the input IP address to the management system 50. The management system 50 refers to a record for the terminal ID "01aa" in the terminal state management table (FIG. 13) to obtain the operation state indicating that the request terminal 10aa is activating the non-dedicated terminal communication function. Based on this operation state indicating activation of the non-dedicated terminal communication function, the converter 57 converts the received data of communication start request to data in compliance with the call control protocol of the non-dedicated terminal, using the conversion rule data. The management system 50 further transmits the converted communication start request to the counterpart terminal, which is the non-dedicated terminal, using the IP address received from the request terminal 10aa. The counterpart non-dedicated terminal 10, which receives the communication start request, sends a response to the management system 50 if the counterpart terminal 10 is capable of communicating with the request terminal 10aa. The management system 50 converts the response received from the counterpart terminal 10 using the conversion data rule, and sends the converted data to the request terminal 10aa. In this manner, the management system 50 establishes a management communication session "sed" between the request terminal 10aa and the counterpart terminal 10, for example, as described above referring to FIG. 4. When the non-dedicated terminal communication function is activated, the request terminal 10aa uses the encoding format that is the same as the encoding format used by the non-dedicated terminal 10, such as the AVC encoding format.

At S50-6, the user enters the IP address of the counterpart dedicated terminal 10. Alternatively, the user may select the location information, such as the IP address, from a memory, when the location information of the non-dedicated terminal 10 is previously stored in the memory.

As described above, in one example, the communication terminal 10 is capable of communicating with a first counterpart communication terminal 10 that communicates using a first call control protocol and a first encoding format, and communicating with a second counterpart communication terminal 10 that communicates using the first call control protocol and a second encoding format. More specifically, the communication terminal 10 is able to selectively use a plurality of communication functions each having the same call control protocol but different encoding formats.

In the above-described example, it is assumed that the communication terminal 10 selects between the dedicated terminal communication function and the non-dedicated terminal communication function. Alternatively, the communication terminal 10 may select one of more than two communication functions each having the same call control protocol but different encoding formats.

Figure 20:
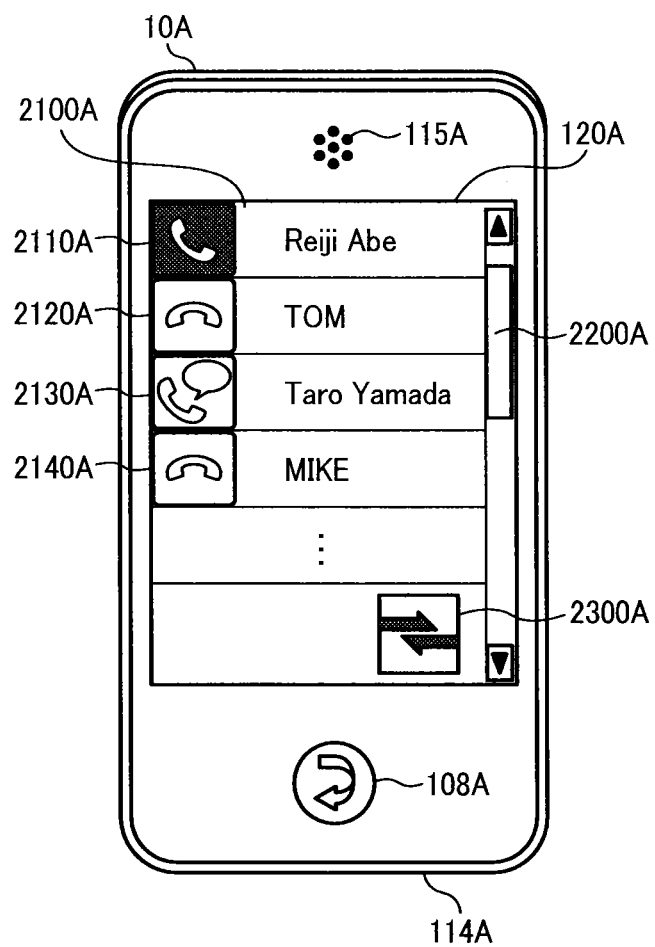
FIG. 20 is an illustration of an example screen displaying a candidate list, performed by a communication terminal, according to an example embodiment of the present invention.

In the above-described example, the communication terminal 10 displays the visual information such as icons on the display 120, as illustrated in FIG. 18. Alternatively, the communication terminal 10 may be implemented by a portable device such as a smart phone as illustrated in FIG. 20. In such case, a terminal 10A, implemented by the smart phone, displays various icons on a display 120A.

Referring to FIG. 20, an operation button 108, a microphone 114A, a speaker 115A, and the display 120A are similar in function and operation to the operation button 108, the microphone 114, the speaker 115, and the display 120. Still referring to FIG. 20, a candidate list 2100A, icons 2110A, 2120A, 2130A, and 2140A that respectively reflect the operation states of the candidate counterpart terminals, a scroll bar 2200A, and a switch icon 2300A are similar in function and operation to the candidate list 2100, the icons 2110, 2120, 2130, and 2140, the scroll bar 2200, and the switch icon 2300.

The various icons illustrated in FIG. 10, 18, or 20 may not only be limited to a graphical image. In alternative to or in addition to the graphical image, any image such as characters or signs may be displayed.

In this example, the relay device 30, the management system 50, the program providing system 90, and the maintenance system 100 may each be implemented by a single computer. Alternatively, any number of parts, functions, or modules of the relay device 30, the management system 50, the program providing system 90, and the maintenance system 100 may be classified into a desired number of groups to be carried out by a plurality of computers. In case the program providing system 90 is implemented by the single computer, the program to be provided by the program providing system 90 may be transmitted, one module by one module, after dividing into a plurality of modules, or may be transmitted at once. In case the program providing system 90 is implemented as a plurality of computers, each computer may transmit each module that is stored in its memory, after the program is divided into a plurality of modules.

A recording medium storing any one of the terminal control program, relay control program, transmission management program, dedicated terminal application, non-dedicated terminal application or a storage device such as the HDD 204 that stores any one of the programs, or the program providing system 90 provided with the HD 204 storing any one of the programs, may be distributed within the country or to another country as a computer program product.

Further, the date and time information stored in the relay device management table of FIG. 11 or the terminal state management table of FIG. 13, or the delay information stored in the session management table of FIG. 15, is expressed in terms of date and time. Alternatively, the date and time information or the delay information may be expressed only in terms of time such as the time at which information is received.

Further, in the above-described examples, the relay device IP address of the relay device 30 and the terminal IP address of the terminal 10 are respectively managed using the relay device management table of FIG. 11 and the terminal state management table of FIG. 13. Alternatively, the relay device 30 and the terminal 10 may each be managed using any other identification information or using any other tables. For example, when the relay device 30 or the terminal 10 needs to be identified on the communications network 2, the relay device or the terminal 10 may be managed using Fully Qualified Domain Name (FQDN). In such case, the communication system 1 is provided with a domain name system (DNS) server that obtains the IP address that corresponds to the FQDN of the relay device 30 or the terminal 10.

In the above-described examples, the communication system 1 of FIG. 1 is treated as a videoconference system. Alternatively, the communication system 1 of FIG. 1 may be implemented as a teleconference system such as the IP teleconference system or the Internet teleconference system. Alternatively, the communication system 1 of FIG. 1 may be implemented as a car navigation system. For example, the request terminal 10 may be implemented as a car navigation system that is installed onto an automobile. The counterpart terminal 10 may be implemented as a management terminal or server at a management center that manages the car navigation system or a car navigation system that is installed onto another automobile. In another example, the communication system 1 of FIG. 1 may be implemented as a communication system having a portable phone. In such case, the terminal 10 is implemented as the portable phone.

In the above-described examples, the contents data is assumed to include image data and sound data. Alternatively, the contents data may include any other type of data that affects human senses of sight in alternative to image data, or any other type of data that affects human senses of hearing in alternative to sound data. Alternatively, the contents data may include any other type of data that affects human senses of sight, smell, taste, touch, and hearing. In case the contents data that affects human senses of touch, the terminal 10 may convey the contents data that reflects senses of touch that is felt by a user at the terminal 10 to another terminal 10 through the communications network 2. In case the contents data that affects human senses of smell, the terminal 10 may convey the contents data that affects senses of smell felt by a user at the terminal 10 to another terminal 10 through the communications network 2. In case the contents data that affects human senses of taste, the terminal 10 may convey the contents data that affects senses of taste felt by a user at the terminal 10 to another terminal 10 through the communications network 2. Further, the contents data may only include one type of contents data selected from sight data such as image data, hearing data such as sound data, touch data, smell data, and taste data.

Further, in the above-described examples, the communication system 1 is implemented as a videoconference system for use at offices. Other examples of use of the communication system 1 include, but not limited to, meetings, casual conversation among family members or friends, and distribution of information in one direction.

Moreover, in the above-described examples, the communication terminal 10 has the outer appearance as illustrated in FIG. 6. Alternatively, the communication terminal 10 may be implemented as a tablet, portable phone, or personal computer. The microphone or camera may not be incorporated into the terminal, but provided outside as long as it is connected to the terminal body.

In the above-described examples referring to FIG. 2, the terminal 10 having the dedicated terminal communication function uses the (4) IM protocol or the (7) extended IM based protocol as a call control protocol. Referring to FIG. 4, the terminal 10 having the non-dedicated terminal communication function uses the SIP or H.323 as call control protocol. Alternatively, any one of the terminal 10 having the dedicated terminal communication function and the terminal 10 having the non-dedicated terminal communication function may use a call control protocol different from the one described above.

Numerous additional modifications and variations are possible in light of the above teachings. It is therefore to be understood that within the scope of the appended claims, the disclosure of the present invention may be practiced otherwise than as specifically described herein.

With some embodiments of the present invention having thus been described, it will be obvious that the same may be varied in many ways. Such variations are not to be regarded as a departure from the spirit and scope of the present invention, and all such modifications are intended to be included within the scope of the present invention. For example, elements and/or features of different illustrative embodiments may be combined with each other and/or substituted for each other within the scope of this disclosure and appended claims.

Further, any of the above-described devices or units can be implemented as a hardware apparatus, such as a special-purpose circuit or device, or as a hardware/software combination, such as a processor executing a software program.

In one example, the present invention may reside in a communication terminal including: an activator configured to activate one of a first communications protocol or a second communications protocol, the first communications protocol and the second communications protocol having the same call control protocols and different encoding formats; a display controller configured to display visual information reflecting an operation state of a candidate counterpart terminal and a graphical image that allows the activator to switch from the first communications protocol to the second communications protocol, respectively, on a display, when the activator activates the first communications protocol; and a receiver configured to receive a user instruction for selecting the graphical image. When the user instruction for selecting the graphical image is received, the activator is configured to activate the second communications protocol to cause the communication terminal to communicate using the second communications protocol.

For example, the present invention may reside in a communication terminal for displaying a candidate list indicating the operation state of a candidate counterpart terminal through displaying means, when a first communication function is activated to allow communication with a counterpart communication terminal using a first call control protocol and a first encoding format. The communication terminal includes: display control means for displaying an icon on the candidate list, which allows a user to switch from the first communication function to a second communication function, the second communication function having the same call control protocol with the first communications protocol but different encoding format than the first communications protocol; receiving means for receiving selection of the icon; and activating means for stopping the first communication function and activating the second communication function based on the selection of the icon.

For example, the display control means or the display controller corresponds to the display control 16. The receiving means or the receiver corresponds to the operation input 12. The activating means or the activator corresponds to the activator 17.

The graphical image that allows switching from the first communications protocol to the second communications protocol includes an icon, such as the switch icon.

As the icon is displayed together with the visual information reflecting the operation state, such as in the candidate list screen, the user can easily switch from the first communications protocol to the second communications protocol.

In another example, the communication terminal further includes a transmitter configured to send operation state information indicating activation of the second communications protocol to a communication management system, when the receiver receives the user instruction for selecting the graphical image.

For example, when the receiving means receives the selection of the icon, the communication terminal further includes transmitting means for transmitting operation state information indicating that the second communication function is activated to a communication management system that manages the operation state of the communication terminal.

In one example, the transmitting means, or the transmitter, corresponds to the data transmitter/receiver 11.

In another example, the communication terminal further includes a storage area configured to store the visual information reflecting the operation state in association with operation state information indicating the operation state. The display controller displays the visual information obtained from the storage area.

For example, the communication terminal further includes visual information management means, which stores visual information in association with the operation state information.

The visual information management means, or the storage area, corresponds to the visual information management DB 1001.

In one example, the present invention may reside in a communication system including any one of the above-described communication terminals and a communication management system. The communication management system includes: a storage area configured to store the operation state information indicating activation of the second communications protocol; a converter to, when the operation state information of the communication terminal indicates activation of the second communications protocol, converts data received from the communication terminal addressed to a counterpart communication terminal so as to be in compliance with the first call control protocol; and a transmitter configured to send the converted data to the counterpart communication terminal, which is communicating using the second communications protocol.

For example, the storage area may correspond to the terminal state management DB 5003. The converter may correspond to the converter 57. The transmitter may correspond to the data transmitter/receiver 51.

The present invention may reside in a method of controlling display at a communication terminal, including: displaying visual information reflecting an operation state of a candidate counterpart terminal and a graphical image that allows the communication terminal to switch from a first communications protocol to a second communications protocol, respectively, on a display, the first communications protocol and the second communications protocol having the same call control protocols and different encoding formats; receiving a user instruction for selecting the graphical image; and activating the second communications protocol to cause the communication terminal to communicate using the second communications protocol.

For example, the present invention may reside in a display control method of displaying a candidate list indicating the operation state of a candidate counterpart terminal through displaying means, while activating a first communication function that allows communication with a counterpart terminal using a first call control protocol and a first encoding format. The display control method includes: displaying an icon on the candidate list, which allows a user to switch from the first communication function to a second communication function, the second communication function having the same call control protocol with the first communications protocol but different encoding format than the first communications protocol; receiving selection of the icon; and stopping the first communication function and activating the second communication function based on the selection of the icon.

The present invention may reside in a non-transitory recording medium storing a plurality of instructions which, when executed by a processor, cause the processor to perform any one of the above-described methods.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cashe memory of the CPU, and the RAM may function as a physical memory or a primary memory of the apparatus, while the HDD may function as a secondary memory of the apparatus.

What is claimed is:

1. A communication terminal, comprising:
processing circuitry configured to activate one of a first communications protocol or a second communications protocol according to a user instruction, the first communications protocol to be used for transmitting at least video data based on a first call control protocol and a first video encoding format, and the second communications protocol to be used for transmitting at least the video data based on the first call control protocol of the first communications protocol and a second video encoding format different than the first video encoding format of the first communications protocol;

a display controller configured to display, on a display, a destination selection screen to receive a selection of a candidate counterpart terminal from among a plurality of displayed candidate counterpart terminals, the destination selection screen including a selectable graphical image that, when selected, causes the processing circuitry to switch the communications protocol to be used for communication with the selected candidate counterpart terminal from the first communications protocol to the second communications protocol, when the processing circuitry activates the first communications protocol as a communications protocol to be used for communication with the candidate counterpart terminal; and a receiver configured to receive, while the destination selection screen is displayed, the user instruction for selecting the graphical image, wherein, when the user instruction for selecting the graphical image is received, the processing circuitry is configured to activate the second communications protocol to cause the communication terminal to communicate with the selected candidate counterpart terminal using the second communications protocol, wherein when the processing circuitry activates the first communications protocol, the communication terminal communicates image data based on the first communications protocol with the selected candidate counterpart terminal via a relay device, and, when the processing circuitry activates the second communications protocol, the communication terminal communicates at least the image data based on the second communications protocol directly with the selected candidate counterpart terminal and not via the relay device.

2. The communication terminal of claim 1, further comprising:

a transmitter configured to send operation state information indicating activation of the second communications protocol to a communication management system, when the receiver receives the user instruction for selecting the graphical image.

3. The communication terminal of claim 1, further comprising:

a memory configured to store visual information reflecting an operation state in association with operation state information indicating the operation state, wherein the display controller displays the visual information obtained from the memory.

4. A communication system, comprising:
the communication terminal of claim 2; and
the communication management system including:
a memory configured to store operation state information indicating activation of the second communications protocol; and
a converter configured to, when the operation state information of the communication terminal indicates activation of the second communications protocol, convert data received from the communication terminal so as to be in compliance with the first call control protocol.

5. A method of controlling display at a communication terminal, comprising:

displaying, on a display, a destination selection screen to receive a selection of a candidate counterpart terminal from among a plurality of displayed candidate counterpart terminals, the destination selection screen including a selectable graphical image that when selected, causes the communication terminal to switch the communications protocol to be used for communication with the selected candidate counterpart terminal from a first communications protocol to be used for transmitting at least video data based on a first call control protocol and a first video encoding format to a second communications protocol to be used for transmitting at least the video data based on the first call control protocol of the first communications protocol and a second video encoding format different than the first video encoding format of the first communications protocol, when activating the first communications protocol as a communications protocol to be used for communication with the candidate counterpart terminal;

receiving, while the destination selection screen is displayed, a user instruction for selecting the graphical image; and activating the second communications protocol to cause the communication terminal to communicate with the selected candidate counterpart terminal using the second communications protocol, wherein when the first communications protocol is activated, the communication terminal communicates image data based on the first communications protocol with the selected candidate counterpart terminal via a relay device, and, when the second communications protocol is activated, the communication terminal communicates at least image data based on the second communications protocol directly with the selected candidate counterpart terminal and not via the relay device.

6. The display control method of claim 5, further comprising:
sending operation state information indicating activation of the second communications protocol to a communication management system, based on the user instruction for selecting the graphical image.

7. The display control method of claim 5, further comprising:
storing, in a memory, visual information reflecting an operation state in association with operation state information indicating the operation state, wherein the displaying displays the visual information obtained from the memory.

8. A non-transitory recording medium storing a plurality of instructions which, when executed by one or more processors, cause the one or more processors to perform a method of controlling display at a communication terminal, the method comprising:

displaying, on a display, a destination selection screen to receive a selection of a candidate counterpart terminal from among a plurality of displayed candidate counterpart terminals, the destination selection screen including a selectable graphical image that when selected, causes the communication terminal to switch the communications protocol to be used for communication with the selected candidate counterpart terminal from a first communications protocol to be used for transmitting at least video data based on a first call control protocol and a first video encoding format to a second communications protocol to be used for transmitting at least the video data based on the first call control protocol of the first communications protocol and a second video encoding format different than the first video encoding format of the first communications protocol, when activating the first communications protocol as a communications protocol to be used for communication with the candidate counterpart terminal;

receiving, while the destination selection screen is displayed, a user instruction for selecting the graphical image; and activating the second communications protocol to cause the communication terminal to communicate with the selected candidate counterpart terminal using the second communications protocol, wherein when the first communications protocol is activated, the communication terminal communicates image data based on the first communications protocol with the selected candidate counterpart terminal via a relay device, and, when the second communications protocol is activated, the communication terminal communicates at least image data based on the second communications protocol directly with the selected candidate counterpart terminal and not via the relay device.

9. The non-transitory recording medium of claim 8, wherein the display control method further comprises:

sending operation state information indicating activation of the second communications protocol to a communication management system, based on the user instruction for selecting the graphical image.

10. The non-transitory recording medium of claim 8, wherein the display control method further comprises:

storing, in a memory, visual information reflecting an operation state in association with operation state information indicating the operation state, wherein the displaying displays the visual information obtained from the memory.

11. The communication terminal of claim 1, wherein the communication terminal is installed with a first communication application enabling communication using the first communications protocol, and a second communication application enabling communication using the second communications protocol, wherein the first communication application and the second communication application are different applications.

12. The communication terminal of claim 11, wherein when the communication terminal is a dedicated terminal, the first communication application is used when communicating with another dedicated terminal, and the second communication application is used when communicating with a non-dedicated terminal that is different than the communication terminal.

13. The method of claim 1, wherein the first communications protocol uses the image encoding format H.264/SVC, and the second communications protocol uses the image encoding format H.264/AVC.

14. The method of claim 5, wherein the communication terminal is installed with a first communication application enabling communication using the first communications protocol, and a second communication application enabling communication using the second communications protocol, wherein the first communication application and the second communication application are different applications.

15. The method of claim 14, wherein when the communication terminal is a dedicated terminal, the first communication application is used when communicating with another dedicated terminal, and the second communication application is used when communicating with a non-dedicated terminal that is different than the communication terminal.

16. The method of claim 5, wherein the first communications protocol uses the image encoding format H.264/SVC, and the second communications protocol uses the image encoding format H.264/AVC.

17. The method of claim 5, further comprising:

receiving, from the user, address information of the selected candidate counterpart terminal, after receiving the user instruction for selecting the graphical image.

* * * * *